(12) United States Patent
DiValentin et al.

(10) Patent No.: US 12,699,770 B2
(45) Date of Patent: Aug. 4, 2026

(54) SYSTEMS AND METHODS FOR DEFENDING AN ARTIFICIAL INTELLIGENCE MODEL AGAINST ADVERSARIAL INPUT

(71) Applicant: Accenture Global Solutions Limited, Dublin (IE)

(72) Inventors: Louis DiValentin, Arlington, VA (US); Changwei Liu, Fairfax, VA (US); Aolin Ding, McLean, VA (US); Malek Ben Salem, Falls Church, VA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 211 days.

(21) Appl. No.: 18/199,360

(22) Filed: May 18, 2023

(65) Prior Publication Data

US 2024/0386096 A1     Nov. 21, 2024

(51) Int. Cl.
*G06F 21/55* (2013.01)

(52) U.S. Cl.
CPC ...... *G06F 21/552* (2013.01); *G06F 2221/033* (2013.01)

(58) Field of Classification Search
CPC ........ G06F 21/554; G06F 21/71; G06F 21/57; G06F 2221/034; G06F 21/606; G06F 21/566; G06F 21/56; G06F 21/552; G06F 2221/033; G06F 21/00; G06F 21/565
See application file for complete search history.

(56) References Cited

U.S. PATENT DOCUMENTS

| | | | | |
|---|---|---|---|---|
| 2020/0410335 A1* | 12/2020 | Gu | ..................... | G06V 10/776 |
| 2021/0157912 A1* | 5/2021 | Kruthiveti Subrahmanyeswara Sai | .............. | G06N 20/00 |
| 2021/0264268 A1* | 8/2021 | Goswami | ............... | G06N 20/00 |
| 2023/0351049 A1* | 11/2023 | Annau | .................... | G06F 21/64 |

* cited by examiner

*Primary Examiner* — Beemnet W Dada
*Assistant Examiner* — Sayeda Salma Nahar
(74) *Attorney, Agent, or Firm* — Mannava & Kang, P.C.

(57) ABSTRACT

Systems and methods for defending an artificial intelligence model against an adversarial input are disclosed. The system may include an artificial intelligence model, such as a machine learning model. The system may include a transformation engine executable by one or more processors. The transformation engine may be configured to receive an input to the artificial intelligence model, and apply a pre-determined transformation set to the input to produce a transformed input. The transformation engine may be configured to generate a first output based on the input using the artificial intelligence model and may also apply the artificial intelligence model to the transformed input to produce a second output. The transformation engine may be configured to determine whether the input is associated with an adversarial attack based on a comparison of the first output and the second output. The system also facilitates generating transformation sets for defending against adversarial attacks.

14 Claims, 10 Drawing Sheets

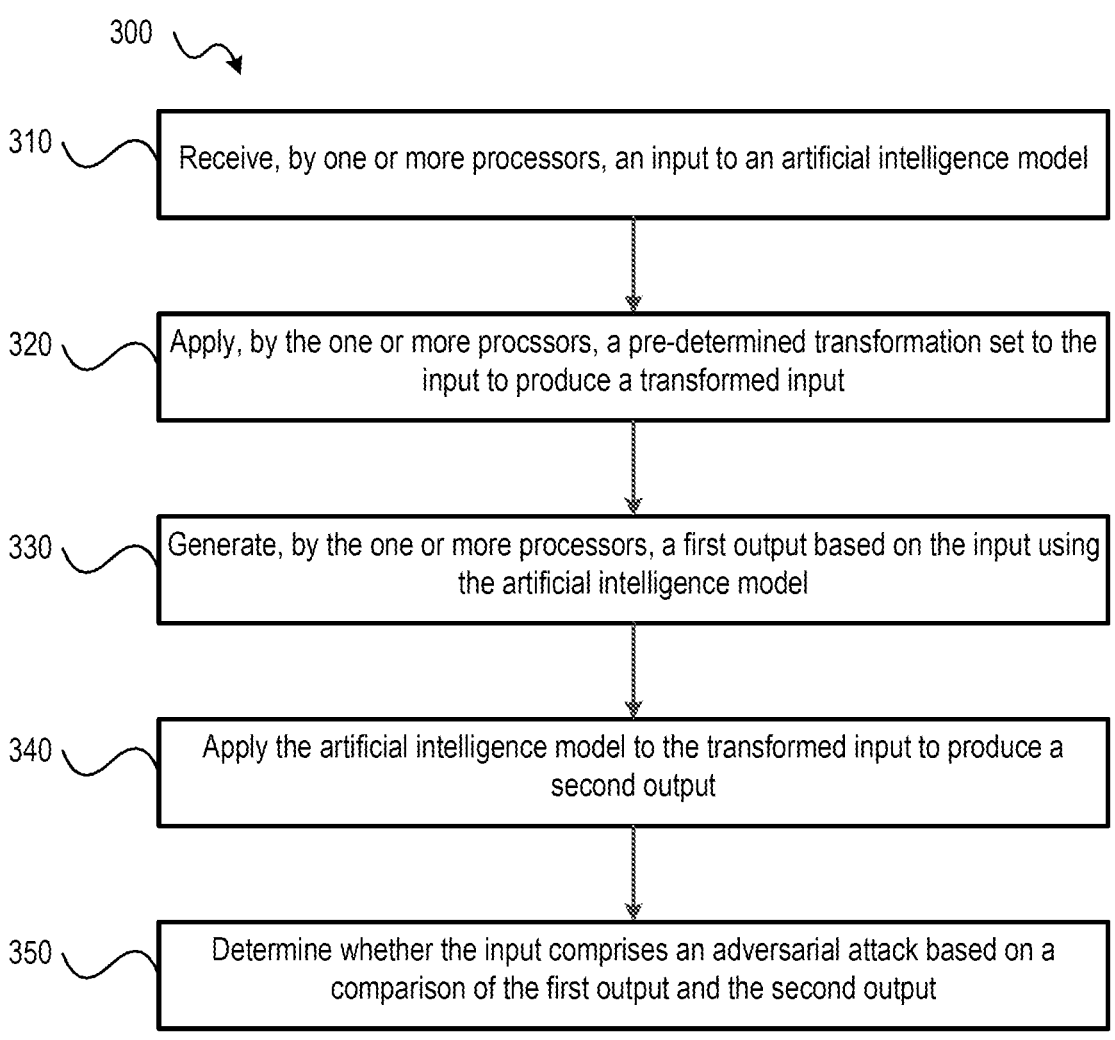

300

310 Receive, by one or more processors, an input to an artificial intelligence model 320 Apply, by the one or more procssors, a pre-determined transformation set to the input to produce a transformed input 330 Generate, by the one or more processors, a first output based on the input using the artificial intelligence model 340 Apply the artificial intelligence model to the transformed input to produce a second output 350 Determine whether the input comprises an adversarial attack based on a comparison of the first output and the second output

FIG. 3

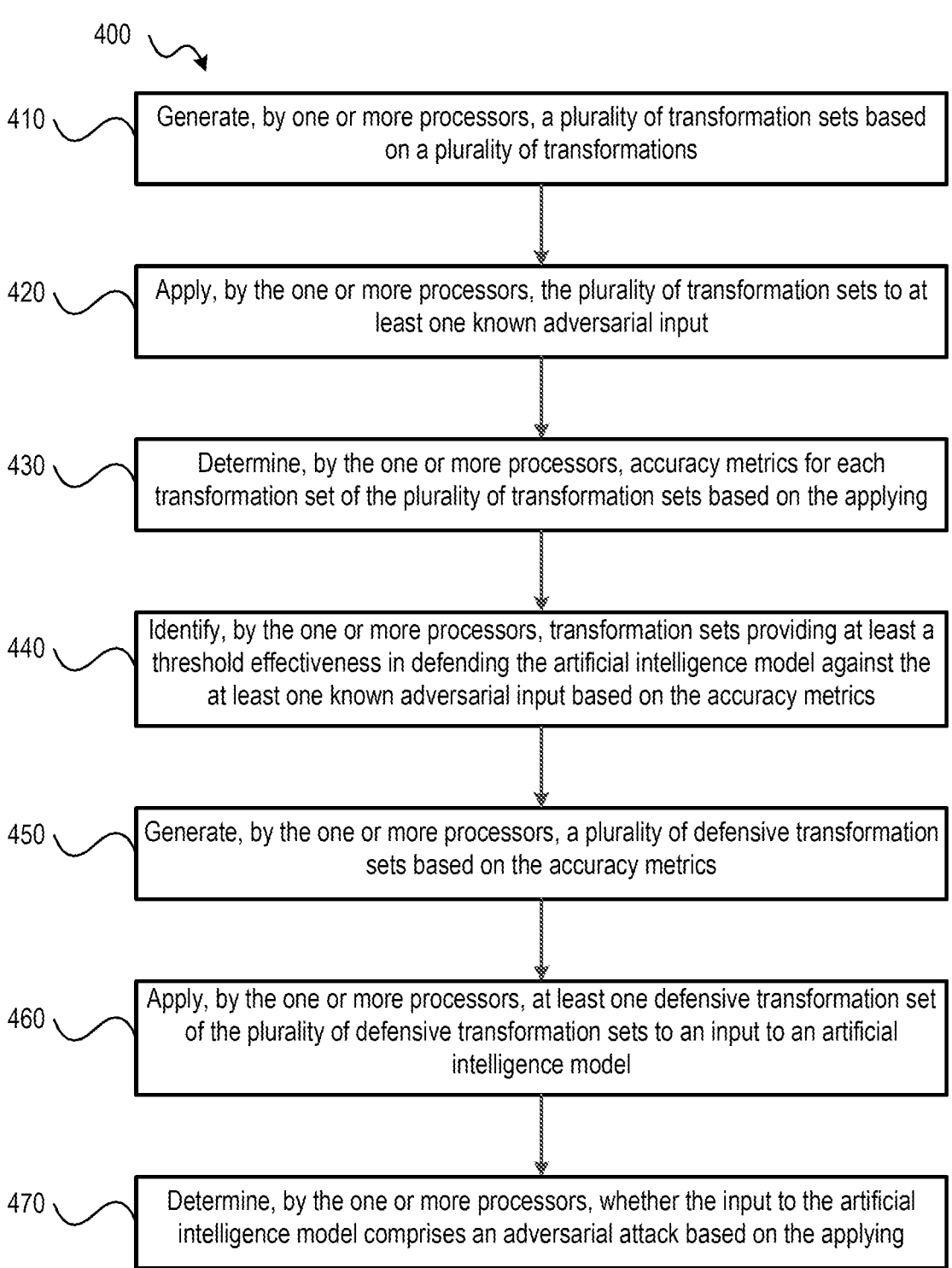

400

410   Generate, by one or more processors, a plurality of transformation sets based on a plurality of transformations 420   Apply, by the one or more processors, the plurality of transformation sets to at least one known adversarial input 430   Determine, by the one or more processors, accuracy metrics for each transformation set of the plurality of transformation sets based on the applying 440   Identify, by the one or more processors, transformation sets providing at least a threshold effectiveness in defending the artificial intelligence model against the at least one known adversarial input based on the accuracy metrics 450   Generate, by the one or more processors, a plurality of defensive transformation sets based on the accuracy metrics 460   Apply, by the one or more processors, at least one defensive transformation set of the plurality of defensive transformation sets to an input to an artificial intelligence model 470   Determine, by the one or more processors, whether the input to the artificial intelligence model comprises an adversarial attack based on the applying

FIG. 4

A: chambolle + mean_filter; B: chambolle +medianfilter; C: chambolle + rescale; D: chambolle + wiener_filter; E: mean_filter + medianfilter; F: mean_filter + rescale; G: mean_filter + wiener_filter; H: medianfilter + rescale; I: medianfilter + wiener_filter; J: rescale + chambolle A: color_reduction + contrast_stretch; B: color_reduction + lab; C: color_reduction + yuv;
D: color_reduction + mean_bi_filter; E: lab + contrast_stretch; F: lab + mean_bi_filter; G: lab + yuv; H: mean_bi_filter + yuv;
I: mean_bi_filter + contrast_stretch; J: yuv + contrast_stretch

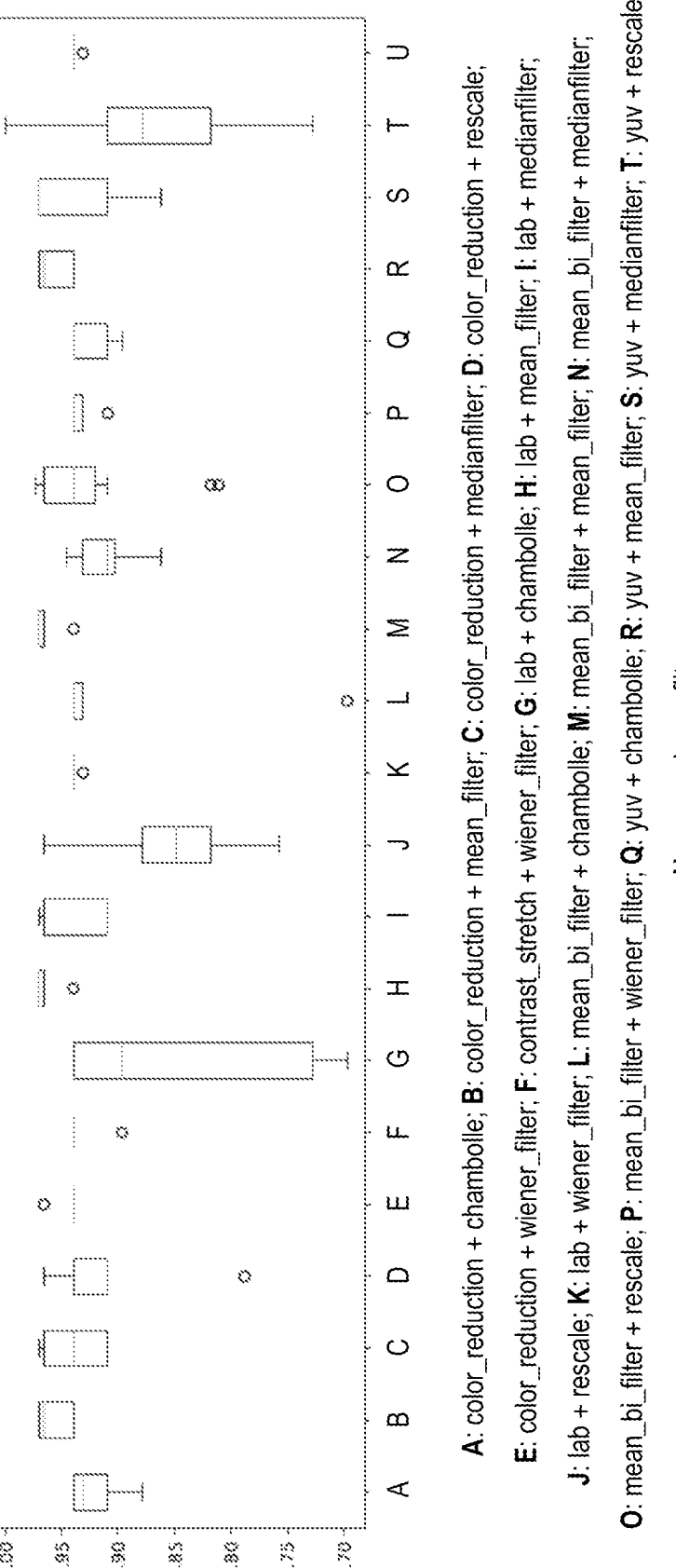

A: color_reduction + chambolle; B: color_reduction + mean_filter; C: color_reduction + medianfilter; D: color_reduction + rescale;

E: color_reduction + wiener_filter; F: contrast_stretch + wiener_filter; G: lab + chambolle; H: lab + mean_filter; I: lab + medianfilter;

J: lab + rescale; K: lab + wiener_filter; L: mean_bi_filter + chambolle; M: mean_bi_filter + mean_filter; N: mean_bi_filter + medianfilter;

O: mean_bi_filter + rescale; P: mean_bi_filter + wiener_filter; Q: yuv + chambolle; R: yuv + mean_filter; S: yuv + medianfilter; T: yuv + rescale;

U: yuv + wiener_filter

FIG. 7

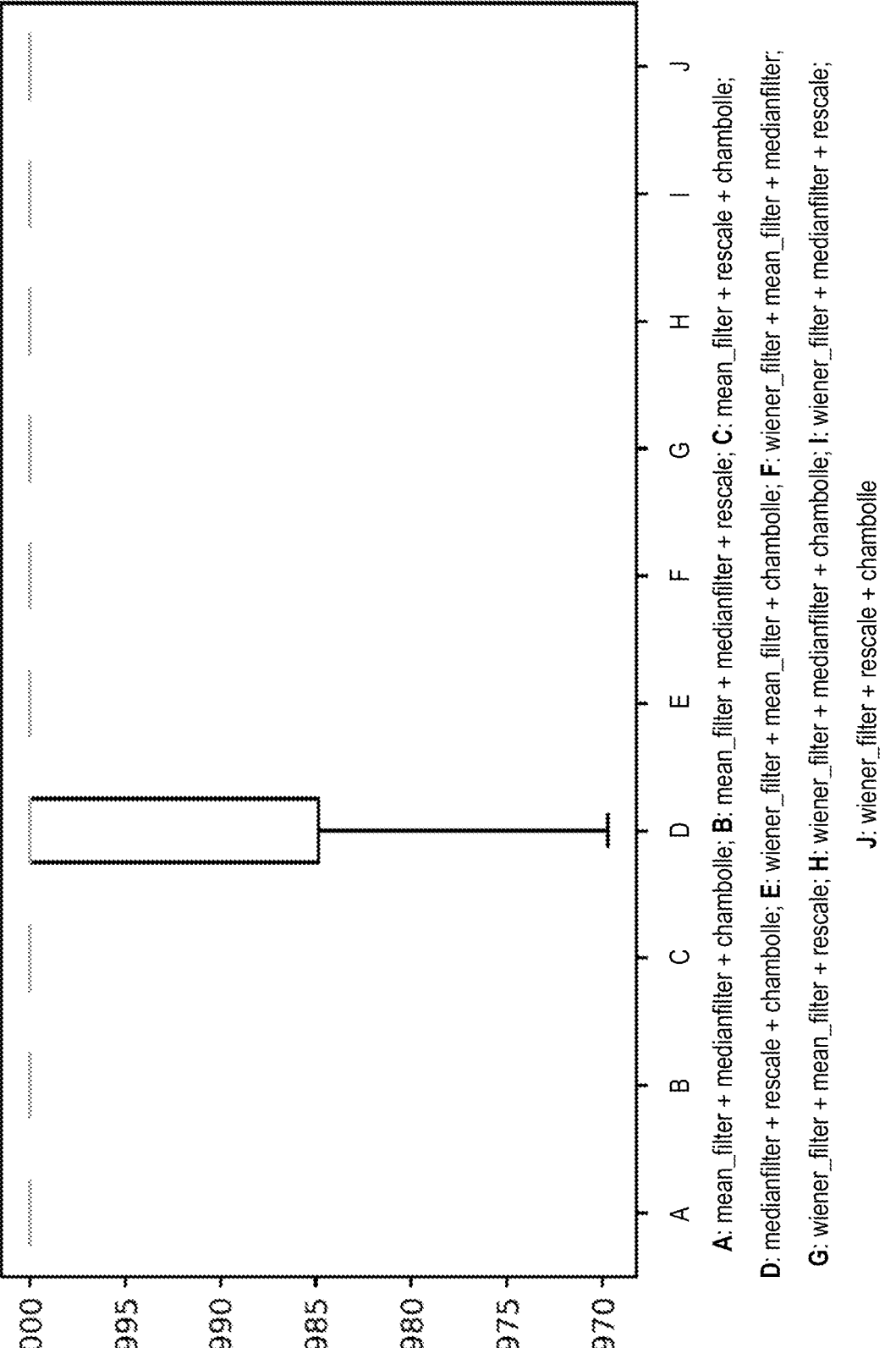

A: mean_filter + medianfilter + chambolle; B: mean_filter + medianfilter + rescale; C: mean_filter + rescale + chambolle;

D: medianfilter + rescale + chambolle; E: wiener_filter + mean_filter + chambolle; F: wiener_filter + mean_filter + medianfilter;

G: wiener_filter + mean_filter + rescale; H: wiener_filter + medianfilter + chambolle; I: wiener_filter + medianfilter + rescale;

J: wiener_filter + rescale + chambolle

FIG. 8

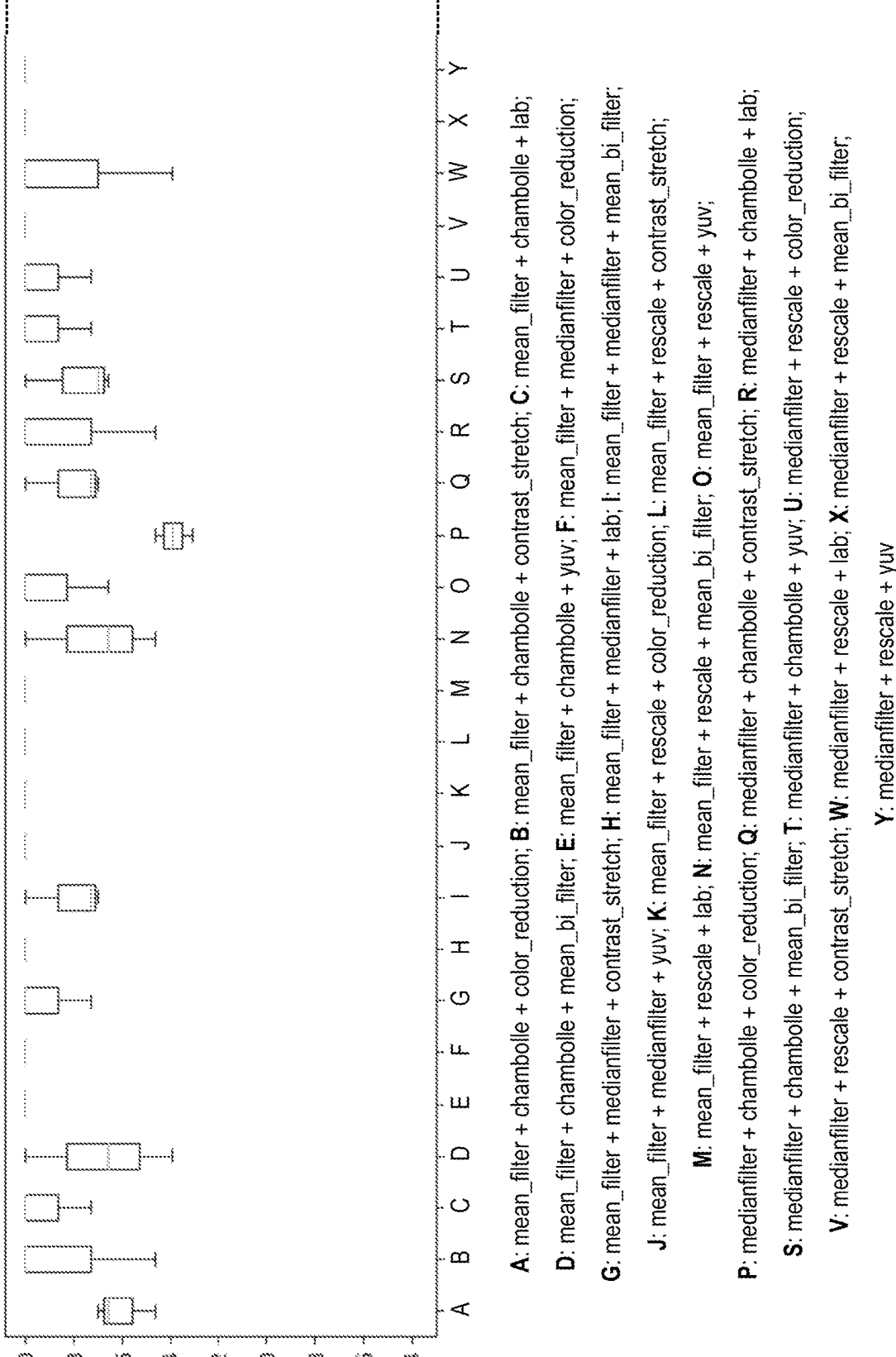

A: mean_filter + chambolle + color_reduction; B: mean_filter + chambolle + contrast_stretch; C: mean_filter + chambolle + lab;

D: mean_filter + chambolle + mean_bi_filter; E: mean_filter + chambolle + yuv; F: mean_filter + medianfilter + color_reduction;

G: mean_filter + medianfilter + contrast_stretch; H: mean_filter + medianfilter + lab; I: mean_filter + medianfilter + mean_bi_filter;

J: mean_filter + medianfilter + yuv; K: mean_filter + rescale + color_reduction; L: mean_filter + rescale + contrast_stretch;

M: mean_filter + rescale + lab; N: mean_filter + rescale + mean_bi_filter; O: mean_filter + rescale + yuv;

P: medianfilter + chambolle + color_reduction; Q: medianfilter + chambolle + contrast_stretch; R: medianfilter + chambolle + lab;

S: medianfilter + chambolle + mean_bi_filter; T: medianfilter + chambolle + yuv; U: medianfilter + rescale + color_reduction;

V: medianfilter + rescale + contrast_stretch; W: medianfilter + rescale + lab; X: medianfilter + rescale + mean_bi_filter;

Y: medianfilter + rescale + yuv

FIG. 9A

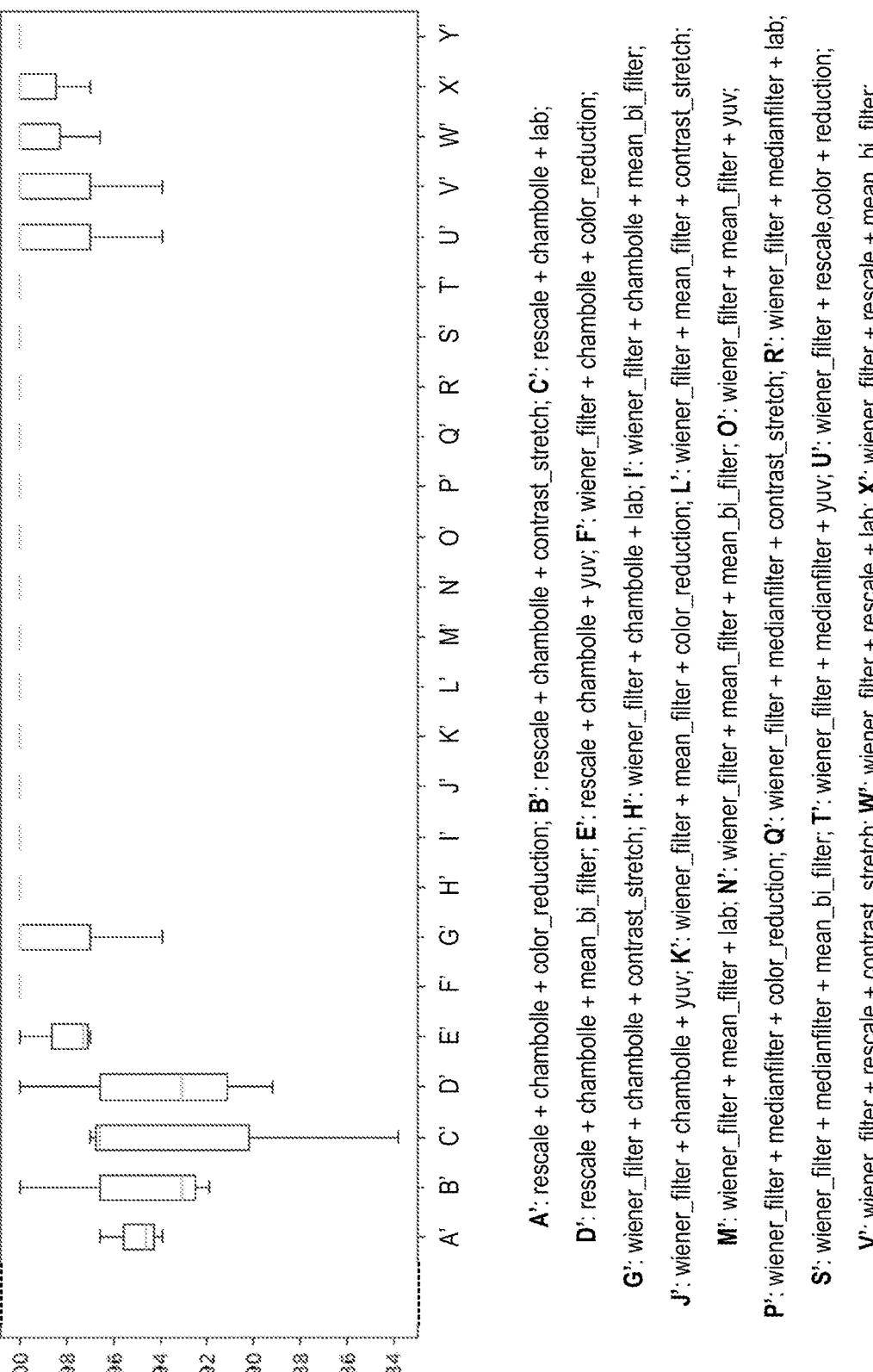

A': rescale + chambolle + color_reduction; B': rescale + chambolle + contrast_stretch; C': rescale + chambolle + lab;

D': rescale + chambolle + mean_bi_filter; E': rescale + chambolle + yuv; F': wiener_filter + chambolle + color_reduction;

G': wiener_filter + chambolle + contrast_stretch; H': wiener_filter + chambolle + lab; I': wiener_filter + chambolle + mean_bi_filter;

J': wiener_filter + chambolle + yuv; K': wiener_filter + mean_filter + color_reduction; L': wiener_filter + mean_filter + contrast_stretch;

M': wiener_filter + mean_filter + lab; N': wiener_filter + mean_filter + mean_bi_filter; O': wiener_filter + mean_filter + yuv;

P': wiener_filter + medianfilter + color_reduction; Q': wiener_filter + medianfilter + contrast_stretch; R': wiener_filter + medianfilter + lab;

S': wiener_filter + medianfilter + mean_bi_filter; T': wiener_filter + medianfilter + yuv; U': wiener_filter + rescale.color + reduction;

V': wiener_filter + rescale + contrast_stretch; W': wiener_filter + rescale + lab; X': wiener_filter + rescale + mean_bi_filter;

Y': wiener_filter + rescale + yuv

FIG. 9B

SYSTEMS AND METHODS FOR DEFENDING AN ARTIFICIAL INTELLIGENCE MODEL AGAINST ADVERSARIAL INPUT

TECHNICAL FIELD

The present disclosure generally relates to artificial intelligence systems and more specifically to systems and methods for defending an artificial intelligence model against adversarial input.

BACKGROUND

Artificial intelligence models, such as machine learning (ML) models (e.g., deep neural networks (DNN)), have been successfully applied to a wide range of computer tasks (e.g., image classification, object detection, and visual concept discovery). Given the ubiquity of artificial intelligence applications, the security aspects of artificial intelligence models have become increasingly important. For example, recent studies have shown that attackers can use adversarial attacks, the samples of input data slightly modified using an optimization procedure, to cause the misclassification of machine learning models. This raises serious concerns about the security of artificial intelligence models in many real-world applications.

As a result of such concerns, developing strong defenses against adversarial attacks has become an important topic of study. An exemplary focus is on model-agnostic techniques, aiming to remove the adversarial input perturbations from the input through different techniques of transforming the input (or input transformation). The robustness of different single input transformation techniques was explored, and it was proposed that use of input transformation ensembles (e.g., a chain or set of input transformations) can provide a stronger defense. It was shown that a computationally stronger defense can be built by stochastically combining a large number of individually input transformation defenses to form a series of randomized transformations, even defeating some adaptive attackers by increasing the computational cost of successful adversarial attacks to infeasible levels. However, this method trades off an increased inference run-time for classification accuracy as each additional transformation is added to the ensemble, which is not practical for enterprise users. Additionally, it provides no guarantee that a transformation combination is effective against certain strong attacks. Research efforts were attempted to improve the model robustness using adversarial training. However, adversarial training is not computationally efficient on large and complex datasets, and the model robustness is not effective for larger image perturbations. Therefore, using ensemble input transformations against adversarial attacks remains an effective method, because it can easily be introduced into a machine learning pipeline without large architectural changes.

Adversarial attacks are inputs algorithmically generated by attackers applying small but intentionally worst-case perturbations to examples from the dataset (e.g., image dataset), so that a machine learning model can misclassify the perturbed input (e.g., perturbed images).

Existing adversarial attacks can be categorized into white-box and black-box attacks. While, in a white-box attack, an adversary has full knowledge of the target model, including model architecture and parameters, in a black-box attack, the adversary can only resort to query access to generate adversarial samples. In addition, a white-box attack is considered as an adaptive attack if the attacker is aware of the defense methods and adapts the attack accordingly.

Adversarial attacks can be untargeted and targeted. For the purposes of illustration, let 1) $x \in X$ be a benign input example in the training dataset X, 2) $Y = \{y_1, y_2, \ldots, y_n\}$ be the class of label space where n is the total number of labels, 3) $x_{adv}$ be the adversarial attack generated by perturbing x with a limited amount of adversarial perturbation noise $\Delta_x = dist(x, x_{adv})$.

Given $x \in X$, the goal $g(\cdot)$ of an adversary is to find an $x_{adv} \in X$ such that 1) with target $t \in Y$, $g(x_{adv}) = t \wedge \Delta_x \leq \varepsilon$ for a targeted attack;

2) $g(x_{adv}) \neq g(x) \wedge \Delta_x \leq \varepsilon$ for an untargeted attack.

Here, the distance metric $\Delta_x$ and the strength of the adversary $\varepsilon$ are used to model how close an adversarial attack needs to be to the original image so that it can keep its semantic value to "fool" a human observer. $\neq_x$ can be $L_0$, $L_1$, $L_2$, or $L_\infty$ norms, where $L_0$ norm denotes the number of pixels of x that are changed; $L_1$ norm denotes the sum of the absolute difference between x and $x_{adv}$; $L_2$ norm represents the Euclidean distance between x and $x_{adv}$; and $L_\infty$ norm denotes the maximum change to any pixel of the image input x.

Defense mechanisms toward adversarial attacks can be categorized into two groups, proactive defenses (e.g., adversarial training, additional regularization, etc.) and reactive defenses (e.g., input transformation and gradient masking). While proactive defenses increase the robustness of DNN models against adversarial attacks, reactive defenses detect the adversarial attacks from the model inputs. As one of the reactive defense methods, input transformations are based on an observation that many adversarial manipulations are not robust, and small transformations to adversarial attack inputs can often recover the desired classification. Input transformations are appealing as a potential solution to adversarial attacks, because they are relatively easy to be introduced into machine learning pipelines, which do not require large architectural changes to the machine learning model.

Different input transformation techniques have been proposed against adversarial attacks. However, many of these defenses have subsequently been broken in isolation by adaptive attacks in the white-box threat models. These adaptive attack methods include incorporating the input transformation defense into the adversary's search procedure, or by approximating the obfuscated gradients that have been masked to make it hard for the adversary to generate an adversarial attack. Even for those defenses used in conjunction with each other, it was argued that two combined defenses still have a large search space to find an adversarial attack that fits the adaptive constraints.

To enhance the robustness of defenses, it was shown that it is possible to construct a "computationally" strong defense if the number of single input transformation defenses is large and the combination is created in a randomized fashion (RT defense). By increasing the number of adaptive constraints, the search space for the adversarial attack can be limited enough that the search for a successful adversarial attack becomes a computationally harder task. However, this method pays a price of an increased runtime. Also, it has been argued that the adaptive attack used to test RT defense is not sufficiently strong, and the RT defense does not necessarily provide a good defense against a strong state-of-the-art attack.

Therefore, a defense against adversarial attacks that is both robust in effectiveness and computationally efficient in performance is desired and remains to be developed.

SUMMARY

The present disclosure provides systems and methods for defending an artificial intelligence model against adversarial input. In an aspect, the present disclosure provides a transformation engine that works with an artificial intelligence model to determine whether an input is associated with an adversarial attack by comparing the artificial intelligence model's outputs with and without certain transformations, respectively. In an aspect, the transformation engine may be housed within a computing device (e.g., a central server), and it may also be housed within various remote devices and functions with or without the computing device. In an aspect, the transformations stored in those devices may be updated from time to time in response to newly emerged adversarial attacks to maintain defensive effectiveness.

In another aspect, the present disclosure provides methods to test and select defensive transformation sets based on certain accuracy metrics. The methods are useful to generate defensive transformation sets that are both robust for identifying adversarial attacks and computationally efficient. In one aspect, the present disclosure provides methods to test and select defensive transformation sets for visual adversarial attacks.

In an aspect, the present disclosure provides a system for defending an artificial intelligence model against adversarial input. The system may include a memory storing a plurality of transformations, and one or more processors communicatively coupled to the memory. The system may include an artificial intelligence model, such as a machine learning model. The system may include a transformation engine executable by the one or more processors. The transformation engine may be configured to receive an input to the artificial intelligence model. Such an input may be captured by sensor devices (e.g., cameras, temperature sensors, motion sensors, etc.), and the sensor devices may be disposed in an environment and may capture information that may be analyzed to evaluate a state of the environment or a state of one or more devices and/or persons within the environment. The transformation engine may be configured to apply a pre-determined transformation set to the input to produce a transformed input. The pre-determined transformation set may include a first combination of transformations selected from among the plurality of transformations based upon a determination that the first combination of transformations provides a threshold level of detection of an adversarial attack on the artificial intelligence model. The transformation engine may be configured to generate a first output based on the input using the artificial intelligence model. The transformation engine may be configured to apply the artificial intelligence model to the transformed input to produce a second output. The transformation engine may be configured to determine whether the input is associated with an adversarial attack based on a comparison of the first output and the second output.

In an aspect, the present disclosure provides a method for defending an artificial intelligence model against adversarial input. The method may include the following steps, which, however, may not necessarily be in a specific order. The steps may include receiving, by one or more processors, an input to an artificial intelligence model. The steps may include applying, by the one or more processors, a pre-determined transformation set to the input to produce a transformed input. The pre-determined transformation set may include a first combination of transformations selected from among a plurality of transformations based upon a determination that the first combination of transformation provides a threshold level of detection of an adversarial attack on the artificial intelligence model. The steps may include generating, by the one or more processors, a first output based on the input using the artificial intelligence model. The steps may include applying the artificial intelligence model to the transformed input to produce a second output. The steps may include determining whether the input is associated with an adversarial attack based on a comparison of the first output and the second output.

In another aspect, the present disclosure provides a method for defending an artificial intelligence model against adversarial input. The method may include the following steps, which, however, may not necessarily be in a specific order. The steps may include generating, by one or more processors, a plurality of transformation sets based on a plurality of transformations. Each transformation set of the plurality of transformation sets may include a different combination of transformations selected from the plurality of transformations. The steps may include applying, by the one or more processors, the plurality of transformation sets to at least one known adversarial input. The steps may include determining, by the one or more processors, accuracy metrics for each transformation set of the plurality of transformation sets based on the applying. The accuracy metrics may include information indicating an effectiveness for each transformation set in defending against the at least one known adversarial input. The steps may include identifying, by the one or more processors, transformation sets providing at least a threshold effectiveness in defending the artificial intelligence model against the at least one known adversarial input based on the accuracy metrics. The steps may include generating, by the one or more processors, a plurality of defensive transformation sets based on the accuracy metrics. Each defensive transformation set of the plurality of defensive transformation sets may include a pre-determined number of transformations selected from the plurality of transformations, and the pre-determined number of transformations in a particular defensive transformation set provide at least the threshold effectiveness in defending against the at least one known adversarial input. The steps may include applying, by the one or more processors, at least one defensive transformation set of the plurality of defensive transformation sets to an input to an artificial intelligence model. The steps may include determining, by the one or more processors, whether the input to the artificial intelligence model is associated with an adversarial attack based on the applying.

The foregoing has outlined rather broadly the features and technical advantages of the present disclosure in order that the detailed description and various examples of the disclosure that follow may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description and examples when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 3 is a flow diagram illustrating an exemplary method for defending an artificial intelligence model against adversarial input in accordance with aspects of the present disclosure;

FIG. 4 is a flow diagram illustrating another exemplary method for defending an artificial intelligence model against adversarial input in accordance with aspects of the present disclosure;

FIG. 7 shows detection rates of transformation ensembles of two combined input transformations with a weak input transformation and a strong input transformation;

FIG. 8 shows detection rates of transformation ensembles of three combined strong input transformations; and FIGS. 9A and 9B are diagrams that collectively show detection rates of transformation ensembles of three combined input transformations with two strong input transformations and one weak input transformation.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Embodiments of the present disclosure provide systems and methods for defending an artificial intelligence model against an adversarial input. As described in more detail below, the disclosed systems and methods defend an artificial intelligence model against an adversarial input in a manner that is more robust and computationally efficient than existing techniques.

Figure 1:
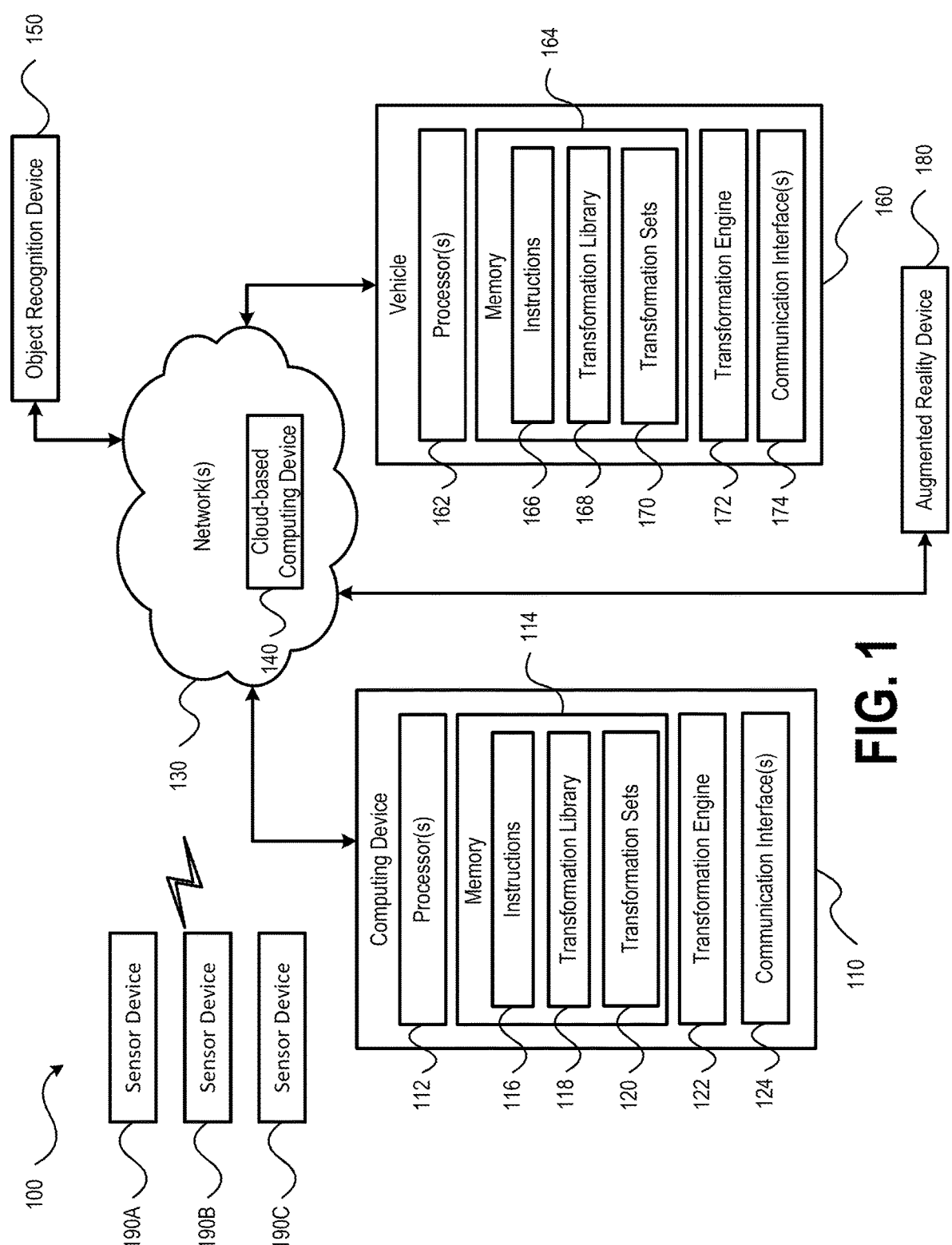
FIG. 1 is a block diagram illustrating a system for defending an artificial intelligence model against adversarial input in accordance with aspects of the present disclosure.

Referring to FIG. 1, a block diagram illustrating a system for defending an artificial intelligence model against adversarial input in accordance with aspects of the present disclosure is shown as a system 100. The system 100 includes a computing device 110 that provides functionality for evaluating transformation sets to determine transformation sets providing strong defenses against adversarial attacks and for detecting whether an input to a machine learning model includes an adversarial attack using one or more of the determined transformation sets. In one aspect, the input may be a visual input, including image content, video content, one or more frames of video content, text content, or any other types of content that may be perceived by a human eye or an optical sensor. As shown in FIG. 1, the computing device 110 includes one or more processors 112, a memory 114, a transformation engine 122, one or more communication interface(s) 124. The one or more processors 112 may include a central processing unit (CPU) or other computing circuitry (e.g., a microcontroller, one or more application specific integrated circuits (ASICs), and the like). The one or more processors 112 may also include one or more graphics processing units (GPUs). As described in more detail with reference to FIGS. 2A and 2B, the functionality provided by the transformation engine 122 may be executable by the one or more processors 112.

The memory 114 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 114 may store instructions 116 that, when executed by the one or more processors 112, cause the one or more processors 112 to perform the operations described in connection with the computing device 110 with reference to FIGS. 1-4. For example, the instructions 116 may include instructions that correspond to the transformation engine 122 and are executable by the one or more CPUs to provide the functionality of the transformation engine 122. Exemplary aspects of the functionality and operations of the transformation engine 122 are described in more detail below with reference to FIGS. 2A and 2B. In addition to the instructions 116, the memory 114 may also store a plurality of transformations, such as a transformation library 118 and one or more transformation sets 120 (also referred to as defensive transformation sets). In some aspects, the computing device 110 may include one or more I/O devices (e.g., one or more display devices, a keyboard, a stylus, one or more touchscreens, a mouse, a trackpad, a camera, one or more speakers, haptic feedback devices, or other types of devices that enable a user to receive information from or provide information to the computing device 110).

The one or more communication interfaces 124 may communicatively couple the computing device 110 to one or more remote devices, such as an object recognition device 150, a vehicle 160, and an augmented reality device 180 via one or more networks 130. In an aspect, the computing device 110 may be communicatively coupled to a cloud-based computing device 140 via wired or wireless communication links according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, and the like). In addition to being communicatively coupled to the cloud-based computing device 140 via the one or more networks 130, the one or more communication interfaces 124 may communicatively couple the computing device 110 to one or more sensor devices, such as sensor devices 190A-190C, or monitored devices. The computing device 110 may be communicatively coupled to sensor devices 190A-190C via a communication link (e.g., a wired communication and/or a communication link established according to a 4$^{th}$ Generation (4G)/long term evolution (LTE) communication standard, a 5<sup>th</sup> Generation (5G) communication standard, another wireless communication protocol, or a combination thereof).

As shown in FIG. 1, the vehicle 160 may include one or more processors 162 and a memory 164. The one or more processors 162 may include one or more CPUs, one or more GPUs, or other computing circuitry (e.g., a microcontroller, one or more ASICs, and the like). The memory 164 may include ROM devices, RAM devices, one or more HDDs, flash memory devices, SSDs, other devices configured to store data in a persistent or non-persistent state, or a combination of different memory devices. The memory 164 may store instructions 166 that, when executed by the one or more processors 162, cause the one or more processors 162 to perform the operations described in connection with the vehicle 160 with reference to FIGS. 1-4. For example, the instructions 166 may include instructions that correspond to functionality of a transformation engine 172, which may operate in a similar manner to the transformation engine 122. In addition to the instructions 166, the memory 164 may also store a plurality of transformations, such as a transformation library 168 and one or more transformation sets 170. The information stored in the transformation library 168 and the one or more transformation sets 170 may be similar to the information stored in the transformation library 118 and the one or more transformation sets 120, respectively. Alternatively, the information stored in the transformation library 168 and the one or more transformation sets 170 may be different from the information stored in the transformation library 118 and the one or more transformation sets 120, respectively. In some aspects, the vehicle 160 may include one or more I/O devices (e.g., one or more display devices, a keyboard, one or more touchscreens, a camera, one or more speakers, haptic feedback devices, or other types of devices that enable a user to receive information from or provide information to the vehicle 160). The vehicle 160 may also include one or more communication interfaces 174, described in more detail below.

Sensor devices 190A-190C may include cameras (e.g., video cameras, imaging cameras, thermal cameras, etc.), temperature sensors, pressure sensors, acoustic sensors (e.g., ultrasound sensors, transducers, microphones, etc.), motion sensors (e.g., accelerometers, gyroscopes, etc.), or other types of devices capable of capturing and recording information associated with the vehicle 160. For example, the vehicle 160 may be an autonomous vehicle, and the sensor devices 190A-190C may monitor the state of the autonomous vehicle, the environment surrounding the autonomous vehicle, or other factors. The sensor devices 190A-190C may capture input information that may be provided to the computing device 110 for analysis to determine whether a traffic or hazard condition is present in the vicinity of the autonomous vehicle (e.g., a stop sign, a speed limit sign, objects on the road, etc.). The computing device 110 may evaluate the input information captured by the sensor devices 190A-190C using the transformation engine 122 and may determine whether the captured input information is legitimate or is associated with adversarial attacks before transmitting the input information to the vehicle 160 based on the evaluating. For example, where an adversarial attack is detected, the computing device 110 may decline to transmit the captured input information to the vehicle 160 and transmit a command to the vehicle 160 to cause the autonomous vehicle to stop or modify one or more of its operating parameters, thereby defending against an adversarial attack and reducing the likelihood of an accident. Additionally or alternatively, the sensor devices 190A-190C may capture input information that may be directly provided to the vehicle 160 for analysis to determine whether a traffic or hazard condition is present in the vicinity of the autonomous vehicle (e.g., a stop sign, a speed limit sign, objects on the road, etc.). The vehicle 160 may evaluate the input information captured by the sensor devices 190A-190C using the transformation engine 172 and may determine whether the captured input information is legitimate or is associated with adversarial attacks before processing the input information by the vehicle 160 based on the evaluating. For example, where an adversarial attack is detected, the vehicle 160 may decline to process the input information and transmit a command to cause the autonomous vehicle to stop or modify one or more of its operating parameters, thereby defending against an adversarial attack and reducing the likelihood of an accident. Exemplary techniques for determining whether the input information captured by the sensor devices 190A-190C is associated with an adversarial attack are described in more detail below with reference to FIGS. 2A and 2B.

Figure 2A:
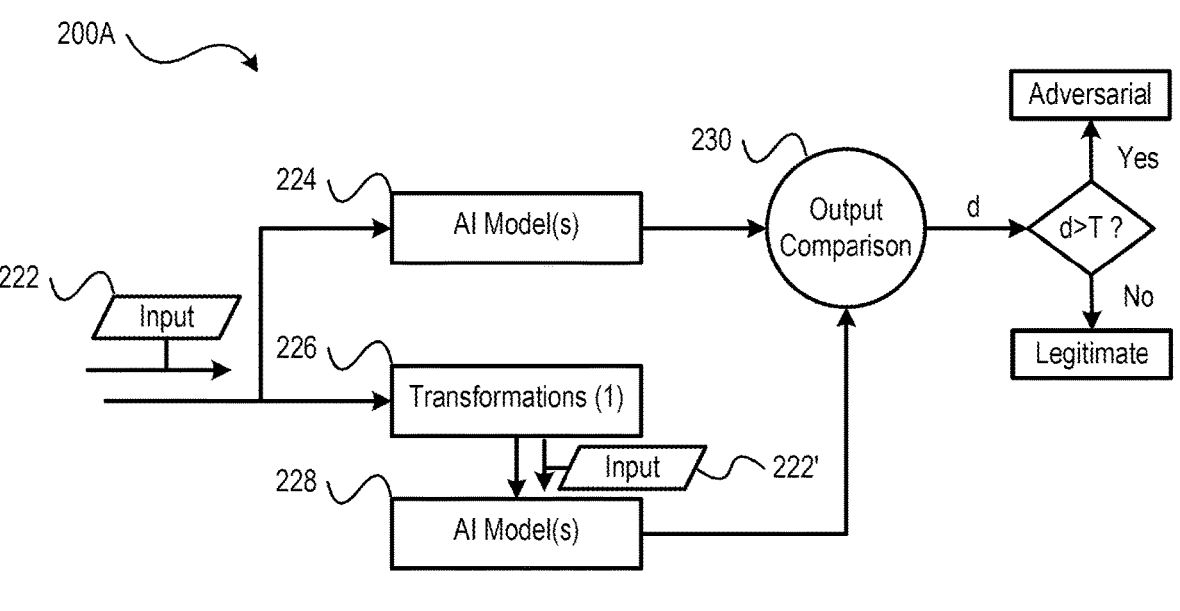
FIGS. 2A and 2B are block diagrams illustrating exemplary aspects of transformation engines within a system for defending an artificial intelligence model against adversarial input in accordance with the present disclosure.
Figure 2B:
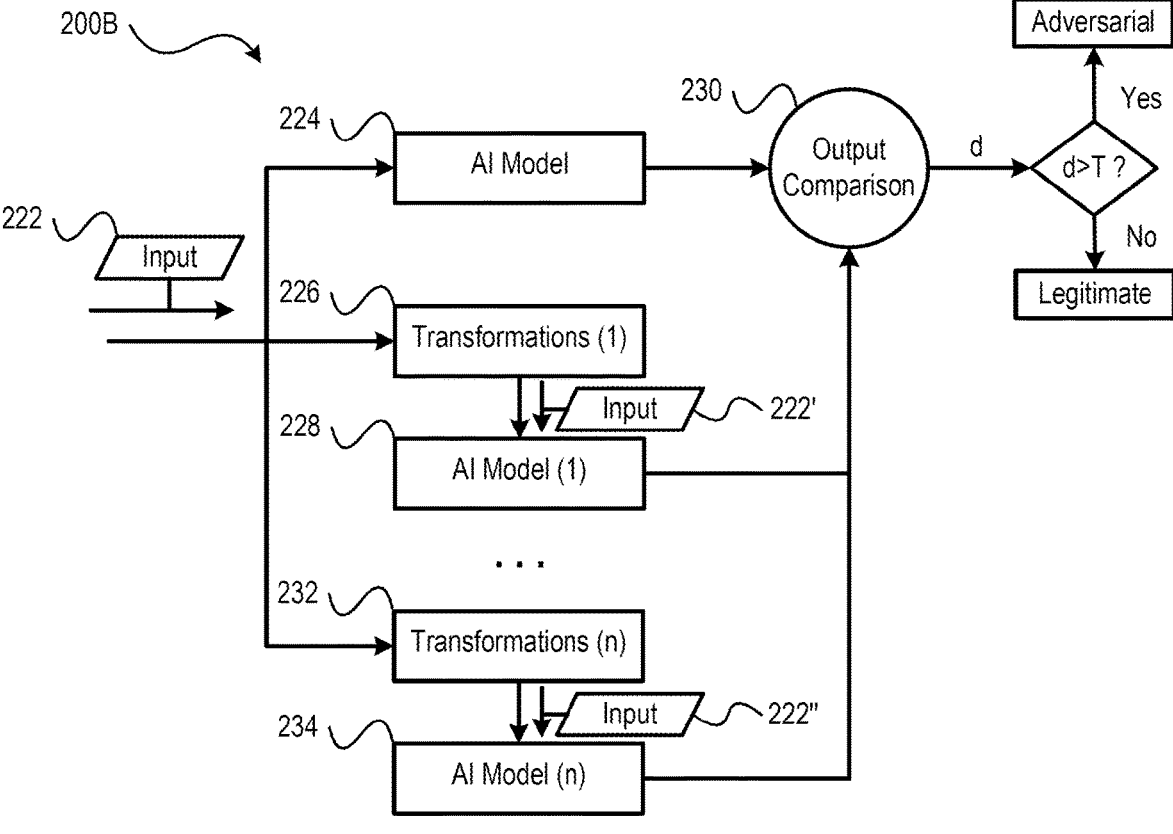

Referring to FIGS. 2A and 2B, block diagrams illustrating exemplary operations for utilizing transformation engines to detect and mitigate adversarial attacks to a machine learning model in accordance with aspects of the present disclosure are shown as exemplary processes 200A and 200B. The exemplary processes 200A and 200B shown in FIGS. 2A and 2B, respectively, may be utilized by a computing device, such as the computing device 110 of FIG. 1, to provide functionality in connection with defending against an adversarial attack.

As shown in FIG. 2A, the process 200A may receive an input 222. In an aspect, the input information 222 may be captured by sensor devices, such as the sensor devices 190A-190C in FIG. 1. Additionally or alternatively, the input information 222 may be obtained from another information source, such as the object recognition device 150 of FIG. 1, a sensor or other components of the vehicle 160 of FIG. 1, the augmented reality device 180 of FIG. 1, a user device, or other types of devices. The input information 222 may be an input to an artificial intelligence model and the process 200A may be configured to detect or determine whether the input information 222 is an adversarial attack on the artificial intelligence model. For example, in FIG. 2A, the artificial intelligence model is shown as artificial intelligence model 224. The artificial intelligence model 224 may be a machine learning model, such as a computer vision model configured to receive an image as input and to output information classifying the image or a portion thereof. For such a model, an adversarial attack may seek to alter the input image such that the model outputs an incorrect classification. In such situations, the alteration of the input image may change characteristics of the image in a manner that impacts the classification of the input image by the model but the alterations may minor enough to go undetected by a human eye. Additionally or alternatively, the alternations may be sufficiently apparent that a human would detect something is off in the image (e.g., due to an adversarial attack), but the model being attacked may be designed to operate as part of an autonomous system such that a human operator is not involved in the image analysis (e.g., a computer vision system utilized by an autonomous or semi-autonomous vehicle).

To determine whether the input information 222 is or includes information related to an adversarial attack, a second instance of the artificial intelligence model 224 may be instantiated, shown in FIG. 2A as artificial intelligence models 228. The process 200A may be configured to apply a pre-determined transformation set 226 to the input information 222 to produce a transformed input 222'. The pre-determined transformation set 226 may include a first pre-determined combination of transformations selected from among a plurality of transformations. To illustrate, the first pre-determined combination of transformations may correspond to one of the transformation sets 120 stored in the memory 114 of FIG. 1. As explained in detail herein, the first pre-determined combination of transformations may be generated based upon a determination that the first pre-determined combination of transformations provides a threshold level of detection of an adversarial attack on the artificial intelligence model 224, wherein the determination that the first pre-determined combination of transformations provides at least the threshold level of detection of the adversarial attack may be based on empirical testing of the pre-determined combination for one or more types of adversarial attacks.

In an aspect, the first pre-determined combination of transformations of the pre-determined transformation set 226 may be applied to the input information 222 in a particular order. For example, the first pre-determined combination of transformations may include at least a first transformation and a second transformation, and the particular order may specify that the second transformation of the first pre-determined combination of transformations is applied to an output generated by application of the first transformation of the first pre-determined combination of transformations to the input information 222. As a variation to the foregoing example, the particular order may specify that the second transformation of the first pre-determined combination of transformations is applied to an output generated by applying twice the first transformation of the first pre-determined combination of transformations to the input information 222. It can be appreciated that the particular order of application of the transformations may introduce another level of varieties of transformations and may generate more diverse transformed inputs.

After the pre-determined transformation set 226 is applied to the input information 222, the transformed input 222' may be provided as input to the artificial intelligence model 228. It is noted that in some implementations the input information 222 and the transformed input 222' may be provided to a single instance of the artificial intelligence model 224, rather than running two instances of the same model—however, running two instances of the same model may improve performance by enabling operations to be performed in parallel.

Related to the above and referring to FIG. 1, besides including the pre-determined transformation set 226 in the one or more transformation sets 120 stored in the memory 114, each transformation set of the one or more transformation sets 120 may include a pre-determined number of transformations of the transformation library 118. Different transformation sets of the one or more transformation sets 120 may include different combinations of the plurality of transformations in the transformation library 118 stored in the memory 114. In another aspect, each transformation set of the one or more transformation sets 120 may include a combination of transformations tested (e.g., based on empirical testing) to provide at least a threshold detection rate with respect to at least one type of adversarial attack. In this manner, the system 100 in FIG. 1 is equipped with a variety of transformation sets, each of which is capable to defend against at least one type of adversarial attack, making the system 100 resilient and effective against a variety of types of adversarial attacks.

In another aspect, one or more of the plurality of transformations in the transformation library 118, one or more of the plurality of transformation sets 120, or both may be updated periodically. Such periodic updates may be for various reasons, such as in response to newly emerged adversarial attacks, continuous optimization of the transformation sets and transformations, or general system upgrades. The system 100 in FIG. 1 may benefit from such periodical updates to remain effective against newly emerged adversarial attacks and remain compatible with upgrades of other system components over time.

Referring back to FIG. 2A, the process 200A may generate a first output based on the input information 222 using the artificial intelligence model 224 and a second output based on the transformed input 222' using the artificial intelligence model 228. The outputs produced by the artificial intelligence models 224, 228 based on the input information 222 and transformed input 222', respectively, may be compared, at block 230, to determine whether the input information 222 is associated with an adversarial attack. To illustrate, if a difference (d) between the output of the artificial intelligence model 224 and the artificial intelligence model 228 exceeds a threshold (T), the input information 222 is determined to be associated with an adversarial attack. On the other hand, if the difference (d) between the output of the artificial intelligence model 224 and the artificial intelligence model 228 does not exceed or equals the threshold (T), the input information 222 is determined to not be associated an adversarial attack.

As can be appreciated from the examples above, where the output of the artificial intelligence model 224 is used to control or otherwise influence additional operations, detection of adversarial attacks using the process 200A may enable discarding of outputs associated with adversarial attacks, thereby preventing such attacks from influencing or exerting control over the additional operations. For example, the artificial intelligence model 224 may be associated with a computer vision model configured to control aspects of autonomous navigation of a vehicle (e.g., the vehicle 160 of FIG. 1) or another type of machine. In such instances, an adversarial attack on the artificial intelligence model 224 may result in unsafe operations of the vehicle. Using the process 200A of FIG. 2A, adversarial attacks may be detected and inputs associated with the adversarial attack may be discarded (e.g., not used to control operations of the vehicle). Additionally or alternatively, a control signal may be generated in response to a determination of whether the input information 222 is associated with an adversarial attack. The control signal may include a first control signal when the input information 222 is not associated with an adversarial attack and may include a second control signal when the input is associated with an adversarial attack. The first control signal and second control signal may be associated with different commands. For example, the transformation engine 172 of vehicle 160 in FIG. 1 may be configured to generate a first control signal as a full stop command when a visual input received by sensor devices 190A-190C is determined to be a legitimate stop sign. However, if the visual input received by sensor devices 190A-190C is determined to be associated with an adversarial attack (e.g., a billboard image that is manipulated to be misclassified by an artificial intelligence model as a stop sign), the transformation engine 172 may generate a second control signal to alert the human operator to verify the visual input and take over vehicle control, instead of a full stop command.

Moreover, by configuring the pre-determined transformation set 226, adversarial attack detection may be performed efficiently and with fewer computing resources as compared to prior techniques where random combinations of transformations were used. Additionally, because the pre-determined transformation set 226 includes a combination of different transformations that has been tested and proved (e.g., as a combination) to provide a strong defense against one or more types of adversarial attacks, the process 200A decreases the likelihood that an adversarial attack goes undetected and/or reduces the number of transformations needed to provide effective detection and mitigation of adversarial attacks.

In FIG. 2B, a process 200B is shown. The process 200B operates in a similar manner to the process 200A of FIG. 2A, but applies multiple transformation sets in parallel. For example, in addition to the operations described with respect to process 200A of FIG. 2A, the process 200B of FIG. 2B processes the input information 222 using multiple pre-determined sets of transformations, shown in FIG. 2B as including n pre-determined sets of transformations 226, 232 to produce n transformed inputs 222', 222". The n different pre-determined transformation sets may each be designed to include transformations providing sufficiently strong defenses against specific types of adversarial attacks. For example, the pre-determined transformation set 226 may be designed to include a transformation set providing a strong defense against a first type of adversarial attack while the pre-determined transformation set 232 may be designed to include a transformation set providing a strong defense against a second type of adversarial attack that is different from the first type of attack. In an aspect, the transform set 226 may include at least one transformation that is different from the transformations included in the transform set 232.

As can be appreciated from the foregoing, the process 200B may be configured to generate a first output based on the input information 222 using the artificial intelligence model 224, and may generate additional outputs via application of the artificial intelligence models 228, 234 (e.g., instances of the artificial intelligence model 224) to the transformed inputs 222', 222", respectively. By applying n different transformation sets to the input information 222, the process 200B may provide more robust protection and/or improved performance as compared to process 200A of FIG. 2A. For example, by applying the n transformations to the input information 222, where n≥2, and then processing the transformed inputs in parallel, mitigation and detection of many different types of attacks may be performed simultaneously (e.g., based on comparison of the output of the model as applied to the input information 222 and each instance of the model to its respective n transformed inputs), as explained above with reference to decision block 230 of FIG. 2A.

As compared to the process 200A of FIG. 2A, the process 200B of FIG. 2B may provide more robust detection and mitigation of adversarial attacks to the artificial intelligence model 224. For example, the n transformation sets may each include a pre-determined transformation set (e.g., transformations selected from among the transformation library 118 of FIG. 1), where different ones of the n transformation sets may be designed to provide a strong defense against different types of adversarial attacks. To illustrate, suppose the process 200B utilize three pre-determined transformation sets (i.e., n=3). A first transformation set may be designed to provide a high level of detection and mitigation for a first type of adversarial attack, while the second and third transformation sets may each provide a lower level of detection and mitigation for the first type of adversarial attack, but provide higher levels of detection and mitigation for other adversarial attacks. In this manner, each of the different transformation sets may be applied to the input information 222 in parallel and then evaluated using the artificial intelligence model for comparison to the output of the artificial intelligence model 224. If the input information 222 is subject to the first type of adversarial attack, detection of the adversarial attack may be detected based on comparison of the output of the artificial intelligence model 224 and an output of the instance of the artificial intelligence model applied to the transformation by the first transformation set. However, if the adversarial attack is of a type that the first transformation set is not designed to provide a strong defense against, detection of the adversarial attack may be detected based on other transformed inputs, such as a transformed input obtained via application of the second or third transformation set to the input information. By applying the different pre-determined transformation sets in parallel, adversarial attack detection and mitigation may be performed based on multiple pre-determined transformation sets in a short amount of time, thereby avoiding a need to sacrifice processing speed as compared to performing multiple transformations serially, which may enable more robust detection of adversarial attacks for critical applications involving artificial intelligence models (e.g., models for controlling autonomous vehicle operations).

Referring to FIG. 3, a flow diagram illustrating an exemplary method for defending an artificial intelligence model against an adversarial input in accordance with aspects of the present disclosure is shown as a method 300. In an aspect, the method 300 may be performed by a computing device, such as the computing device 110 of FIG. 1 and may utilize a process similar to the process 200A of FIG. 2A or the process 200B of FIG. 2B. In some aspects, steps of the method 300 may be stored as instructions that, when executed by one or more of processors (e.g., the one or more processors 112 of FIG. 1), cause the one or more processors to perform the steps of the method 300 to defend an artificial intelligence model against adversarial input in accordance with the concepts disclosed herein.

At step 310, the method 300 includes receiving, by one or more processors, an input to an artificial intelligence model. As explained above, when an input is received for processing by an artificial intelligence model, it may be unknown whether the input has been impacted by or is the subject of an adversarial attack on the artificial intelligence model. Thus, where the output of the artificial intelligence model is used to control or influence other operations, tasks, or processing, the input should be confirmed as being valid (i.e., not an adversarial attack) before such output is utilized in downstream processing and operations.

Accordingly, at step 320, the method 300 includes applying, by the one or more processors, a pre-determined transformation set to the input to produce a transformed input. The pre-determined transformation set may include a first combination of transformations selected from among a plurality of transformations based upon a determination that the first combination of transformation provides a threshold level of detection of an adversarial attack on the artificial intelligence model. In an aspect, the pre-determined transformation set may be applied, at step 320, as described above with reference to process 200A of FIG. 2A. In an additional or alternative aspect, step 320 may include applying additional transformation sets in parallel, such as described above with reference to process 200B of FIG. 2B by using n number of transformation sets.

At step 330, the method 300 includes generating, by the one or more processors, a first output based on the input using the artificial intelligence model. In an aspect, the first output may be generated as described above with reference to input information 222 and artificial intelligence model 224 of FIGS. 2A and 2B. At step 340, the method 300 includes applying the artificial intelligence model to the transformed input to produce a second output. In an aspect, the second output may be generated as described above with reference to transformed input 222' and artificial intelligence model 228 of FIGS. 2A and 2B. Additionally, where multiple pre-determined transformation sets are applied to the input, the artificial intelligence model may be applied to additional transformed inputs, as described with reference to transformed input 222" and artificial intelligence model 234 of FIG. 2B.

At step 350, the method 300 includes determining whether the input comprises an adversarial attack based on a comparison of the first output and the second output. In an aspect, step 350 may additionally include comparing the first output to multiple second outputs generated in parallel using additional transformations, such as described above with reference to FIG. 2B. As explained above, outputs of the artificial intelligence model may be utilized to provide control signals or otherwise impact downstream processing of the input data. Accordingly, where the input data is detected, at step 350, to include an adversarial attack, the output of the artificial intelligence model may be determined to be compromised and may not be used to provide control of a machine or configure downstream processing of the input(s). To illustrate, where the artificial intelligence model is a computer vision model for an autonomous vehicle, the output of the artificial intelligence model may be a classification that indicates whether a vehicle is travelling within a designated lane of a road or whether there is an object or person in the road along the path of travel of the vehicle. Such classifications may be used to control autonomous driving operations of the vehicle, such as to course correct if the vehicle is not in the middle of the lane or to initiate braking if an object is detected along the path of travel of the vehicle (e.g., as part of a collision avoidance procedure). If the input is detected to be an adversarial attack, the input may be determined to be compromised and discarded, rather than using the input to control operations of the vehicle. It is noted that while adversarial inputs may be discarded when detected, such description should not be interpreted to mean that no actions may be taken by the system based on such detection. For example, when an adversarial input is detected by a computer vision model used for autonomous vehicle operations, the adversarial input may be discarded by the vehicle, but the vehicle may slow its rate of travel to compensate for a brief period of time (e.g., until a new valid input is received).

Referring to FIG. 4, a flow diagram illustrating another exemplary method for defending an artificial intelligence model against adversarial input in accordance with aspects of the present disclosure is shown as a method 400. In an aspect, the method 400 may be performed by a computing device, such as the computing device 110 of FIG. 1, to generate pre-determined transformation sets providing a threshold level of defense against one or more types of adversarial attacks. For example, transformation sets generated using the method 400 may be utilized to defend against adversarial attacks using the process 200A of FIG. 2A or the process 200B of FIG. 2B. In some aspects, steps of the method 400 may be stored as instructions (e.g., the instructions 116 of FIG. 1) that, when executed by one or more processors (e.g., the one or more processors 112 of FIG. 1), cause the one or more processors to perform the steps of the method 400 to defend an artificial intelligence model against adversarial input in accordance with the concepts disclosed herein.

At step 410, the method 400 includes generating, by one or more processors, a plurality of transformation sets based on a plurality of transformations. For example, each transformation set of the plurality of transformation sets may include a different combination of transformations selected from the plurality of transformations (e.g., transformations selected from the transformation library 118 of FIG. 1). In an additional or alternative aspect, each transformation set of the plurality of transformation sets may include one transformation selected from the plurality of transformations (e.g., a transformation selected from the transformation library 118 of FIG. 1). As explained above with reference to FIG. 1, the plurality of transformation sets may be stored in a memory, such as the transformation sets 120 of FIG. 1.

At step 420, the method 400 includes applying, by the one or more processors, the plurality of transformation sets to at least one known adversarial input. The at least one known adversarial input may include one or more types of known adversarial attacks. Examples of known adversarial inputs and their various types are described in Example 1 below. In an aspect, the plurality of transformation sets may each be applied a single type of known adversarial input. In an additional or alternative aspect, the plurality of transformation sets may each be applied to multiple different types of known adversarial inputs. In an aspect, the plurality of transformation sets may be applied serially to the at least one known adversarial input, for example, using the process 200A of FIG. 2A. In an additional or alternative aspect, the plurality of transformation sets may be applied in parallel to the at least one known adversarial input, for example, using the process 200B of FIG. 2B. If the process 200B of FIG. 2B is used, multiple transformation sets may be tested simultaneously according to method 400 to evaluate each one of them for accuracy metrics and effectiveness to increase computational efficiency.

At step 430, the method 400 includes determining, by the one or more processors, accuracy metrics for each transformation set of the plurality of transformation sets based on the applying. The accuracy metrics may include information indicating an effectiveness for each transformation set in defending against the at least one known adversarial input. In an aspect, the accuracy metrics may be determined based on applying the process 200A or the process 200B to the at least one known adversarial input using the plurality of transformation sets. For example, the plurality of transformation sets may be applied to the at least one known adversarial input in order to test the effectiveness of each transformation set of the plurality of transformation sets with regard to defending against the at least one known adversarial input, which may be, for example, measured by a detection rate (e.g., a percentage rate) of correctly determining the at least one known adversarial input to be associated with an adversarial attack. In some aspects, multiple different types of known adversarial inputs may be tested using the plurality of transformation sets to evaluate which transformation sets provide strong defenses against each different type of adversarial input.

At step 440, the method 400 includes identifying, by the one or more processors, transformation sets providing at least a threshold effectiveness in defending the artificial intelligence model against the at least one known adversarial input based on the accuracy metrics.

At step 450, the method 400 includes generating, by the one or more processors, a plurality of defensive transformation sets based on the accuracy metrics. Each defensive transformation set of the plurality of defensive transformation sets may include a pre-determined number of transformations selected from the plurality of transformations, and the pre-determined number of transformations in a particular defensive transformation set may provide at least the threshold effectiveness in defending against the at least one known adversarial input. In an aspect, the plurality of defensive transformation sets may be transmitted to a remote device. For example, the remote device may include the vehicle 160 of FIG. 1, the augmented reality device 180 of FIG. 1, the object recognition device 150 of FIG. 1, or a combination of any of the foregoing. Moreover, the plurality of defensive transformation sets may be updated periodically based on one or more newly emerged adversarial attacks to produce an updated plurality of defensive transformation sets, as to keep the method 400 effective in defending against state-of-the-art adversarial attacks as they emerge. In one aspect, the updated plurality of defensive transformation sets may be transmitted to any of the foregoing remote devices, so that the remote devices can also stay effective in defending against state-of-the-art adversarial attack as they emerge.

At step 460, the method 400 includes applying, by the one or more processors, at least one defensive transformation set of the plurality of defensive transformation sets to an input to an artificial intelligence model. For example, the input to the artificial intelligence model may be received from a sensor, like sensor devices 190A-190C in FIG. 1, and the sensor may include one or more cameras (e.g., video cameras, imaging cameras, thermal cameras, etc.), one or more temperature sensors, one or more pressure sensors, one or more acoustic sensors (e.g., ultrasound sensors, transducers, microphones, etc.), one or more motion sensors (e.g., accelerometers, gyroscopes, etc.), or other types of devices capable of capturing and recording information.

At step 470, the method 400 includes determining, by the one or more processors, whether the input to the artificial intelligence model is associated with an adversarial attack based on the applying. Additionally or alternatively, as similarly described for the process 200A of FIG. 2A, the method 400 may include generating, by the one or more processors, a control signal in response to the determining of whether the input to the artificial intelligence model is associated with an adversarial attack. The control signal may include a first control signal when the input is not associated with an adversarial attack and may include a second control signal when the input is associated with an adversarial attack. The first control signal and second control signal may be associated with different commands.

As described above, the method 400 enables a computing device, such as the computing device 110 of FIG. 1, to defend an artificial intelligence model against adversarial input while providing robust effectiveness and computationally efficient performance. In some aspects, the method 400 realizes detection rates from 96% to 100% while using less transformations and remaining more computationally efficient than existing techniques. Moreover, it is noted that the robust effectiveness and computationally efficient performance of the method 400 are provided, at least in part, by the systems and processes of embodiments, as described and illustrated with reference to FIGS. 1, 2A, and 2B.

Moreover, it is to be understood that method 400 and the concepts described and illustrated with reference to FIGS. 1, 2A, and 2B may be utilized to provide robust effectiveness and computationally efficient performance that leverage 5G or other next generation network and cloud computing architectures. Certain remote devices may have limited computing resources as compared to traditional client-server systems or computing architectures and yet may achieve rapid and accurate analysis of input data and effectively defend against adversarial inputs as described above. Thus, embodiments of the present disclosure should be recognized as providing a framework for designing devices and systems that, even with limited resources, are capable of performing "or solving for" real-time and mission critical use cases.

EXAMPLES

The following examples are presented in order to more fully illustrate the various embodiments of the present disclosure. They should in no way, however, be construed as limiting the scope of the present disclosure.

Example 1

Adversarial Attacks

To have a thorough evaluation on defense effectiveness, a variety of adversarial attack examples were chosen. These attacks include not only the common baseline attacks, but also the strongest benchmark attacks, which are necessary for defense evaluation and strong defense construction. Any one of or any combination of these adversarial attack examples may serve as or be used to generate an exemplary known adversarial input as described in this disclosure, such as the at least one known adversarial input referenced in method 400 of FIG. 4.

White-Box Attacks

Fast Gradient Sign Method: FGSM ($L_\infty$, Untargeted) FGSM is a typical one-step attack algorithm, which does not require an iterative procedure to compute the gradient of the adversarial loss. Given x as an benign image input, an adversarial image $x_{adv}$ is generated by adding optimal max-norm constrained perturbations to x as follows:

$$x_{adv} = x + \epsilon \cdot \text{sign}(\nabla_x J(\theta, x, y)) \tag{1}$$

Here, $\epsilon$ is a randomly initialized hyper-parameter, sign(.) is a sign function, $\theta$ is the parameters of a model, y is the correct label of x, $J(\theta, x, y)$ is the cost of training the neural network, and $\nabla_x J(.)$ represents the gradient of x, which is obtained using the gradient vector of the loss function $J(\theta, x, y)$.

Basic Iterative Method and Projected Gradient Descent: BIM and PGD ($L_\infty$, Untargeted) FGSM may be extended to a multi-step by applying it multiple times with small step size and clipping pixel values of the intermediate results after each step, making sure those values are in an $\epsilon$-neighborhood of the original image. Let N be the n-th iteration.

$$x_{N+1}^{adv} = \text{Clip}_{x,\epsilon}\{x_N^{adv} + \sigma \cdot \text{sign}(\nabla_x J(x_N^{adv}, y))\} \tag{2}$$

where $\sigma N=\epsilon$, $\sigma$ is the magnitude of the perturbation in each iteration. $\text{Clip}_{x,\epsilon}$ function performs per-pixel clipping of the adversarial image, so the result will be in $L_\infty$ $\epsilon$-neighbourhood of the source image x.

PGD is a variation of BIM. Instead of directly clipping $$x_N^{adv} + \sigma.\text{sign}(\nabla_x J(x_N^{adv}, y)),$$

PGD constrains the adversarial perturbations by projecting the adversarial samples learned from each iteration into the $L_\infty$ $\epsilon$-neighbor of benign samples. Correspondingly, the procedure of Equation 2 is updated to Equation 3.

$$x_{N+1}^{adv} = Proj_{x_\epsilon}\{x_N^{adv} + \sigma \cdot \text{sign}(\nabla_x J(x_N^{adv}, y))\} \qquad (3)$$

Carlini/Wagner Attacks: CW ($L_0$, $L_2$ and $L_\infty$ Targeted) Three gradient descent attacks that use $L_0$, $L_2$ and $L_\infty$ norms were introduced respectively. The $CW_2$ attack finds adversarial attack examples that have a low distortion in the $L_2$ metric. It perturbs fewer regions with smaller changes on most pixels by using the following designs: (1) it adopts a notation that uses the logits Z(·) instead of the final prediction F(·) in the loss function, which is critical for the robustness of the CW attack against the defensive distillation methods; (2) it searches for a parameter w that encourages the optimal solver to find an adversarial input $x_{adv}$ that will be classified as target/with high confidence.

$CW_0$ attack uses the $CW_2$ attack to identify some pixels that do not have significant effects on the classifier output, and correspondingly freezes these pixels so that their values can never be changed. This process repeats until the $L_2$ adversary fails to find an adversarial attack example, and as a result, the features with significant effects on the classifier output will be changed. This makes $CW_0$ attack more difficult than $CW_2$.

The $CW_\infty$ attack recognizes the facts that $L_\infty$ norm is hard to optimize and only the maximum term but any of the others is penalized. The issue was resolved by using an iterative attack, which replaces the $L_2$ term with a penalty for any terms that exceed a threshold $\zeta$ (initially set as 1, and decreased in each iteration). As the consequence, all the perturbations of a $CW_\infty$ attack are smaller than $\zeta$.

Adaptive Attacks

Backward Pass Differentiable Approximation (BPDA) An adaptive attack is constructed after a defense has been completely specified, where the adversary takes advantage of the knowledge of the defense. Because many adversarial attacks, including FGSM, IBM, PGD, and CW attacks listed above, are gradient-based attacks, one proposal to defeat them was by using obfuscated gradients that are called BPDA.

Let t(.) represent transform. In BPDA, a neural network is used to learn a function $f_t()$ that approximates the transform. Since the defense is implemented with a neural network, $f_t()$ is differential. Thus, $\nabla f_t()$ obtains a gradient for the adversary to use as an approximation to $\nabla_t()$.

Example 2

A Library of Input Transformations

A library of input transformations was established. Exemplary input transformations were categorized into nine groups as follows. This exemplary library of input transformations described below may be the types of transformations to be included in the transformation library 118 in FIG. 1.

Color Precision Reduction: Color precision reduction reduces the bit depth of each color pixel. This method increases the robustness of an ML model by reducing the variation among pixels of adversarial attack examples. One exemplary implementation of this method may use a random pixel reduction number and selects a random number of colors for each channel.

Noise Injection: It was shown that Gaussian noise can be added to fight against adversarial attack examples. Besides this technique, other noise addition techniques, including Salt and Pepper, Poisson and Speckles were also included in the library.

Swirl: The swirl method rotates the pixels around a randomly selected point in the image. The two key parameters in this method: radius indicating the swirl extent in pixels and strength representing the amount of swirl are randomly selected between [10, 200] and [0.1, 2.0].

Fast Fourier Transform (FFT) perturbation: FFT perturbation decomposes images into frequency domains. The frequency in an image indicates the rate of change of pixel values. In this example, for each channel (Red, Green and Blue) of the input image, a randomly chosen coefficient value between [0.98, 1.02] is used to perturb the 2D FFT, and for each channel, a random choice can be made between: zeroing out the random coefficients of the FFT, and zeroing out the lowest frequency coefficients of the FFT. In addition, the random values for the random coefficients of the 2D FFT can be randomly selected between [0.0, 0.95]. After the coefficients are altered in the frequency domain, the inverse transform re-transforms the frequencies to a modified image.

Zoom group: In one approach (referenced as "random padding" in this example), two randomization operations including random resizing and random padding were used. While random resizing resizes the input images to a random size (a number between 75% and 100% of the image), the random padding pads a different color (grey was chosen in this exemplary implementation) around the input images. The other approach is a simple zoom function. Compared to random padding, the simple zoom function is a relatively weak input transformation, which only re-scales the image and zooms in on a portion of the image.

Color space group: In this example, color space group implementation includes HSI (hue, saturation, value), XYZ (XYZ represents color sensations to human eyesight), LAB (LAB represents luminaries component, the component of green-red axis and the component of blue-yellow axis) and YUV (While Y component determines the brightness of the color, U and V components determine the color itself). This group of input transformations first converts an image from RGB (Red, Green, Blue) to a different color space, then adds a random constant value, and finally converts it back to the RGB space.

Contrast group: The input transformation techniques in the contrast group improve the contrast in an image by spanning the range of intensity values to a desired pixel value the image allows. In this example, an implementation of histogram equalization is used to enhance the contrast.

Grey scale group: Both human beings and machine learning models recognize most objects in grey scales. Transforming RGB-colored images to grey-scaled images can be taken as a kind of defense against adversarial attack examples. In this example, the implementations of four different grey-scale transformations including grey, greymix, greyscale, onechannel are used.

Denoising group: Since the discovery that the features for a clean image primarily focus on semantically informative content and the feature maps for an adversarial image are activated across semantically irrelevant regions, using denoising techniques has been proposed to defeat adversarial attack examples. For this example, techniques including JPEG compression, gaussian blur, median filtering, wavelet, chambolle, wiener filter are included in this group.

Overall, at least 33 input transformation techniques were included in the library of this example. They are Group 1: color reduction, Group 2: noise injection (including injecting JPEG, gaussian, poisson, speckle, salt, pepper, and salt and pepper noise), Group 3: swirl, Group 4: FFT perturbation, Group 5: random zoom, random padding, seam carving expansion, Group 6: color space alternation (HSV, XYZ, LAB, YUV), Group 7: contrast (histogram equalization, adaptive histogram equalization, contrast stretching), Group 8: grey scale mix, grey scale partial mix, ⅔ grey scale mix, one channel partial grey, and Group 9: denoising (JPEG compression, gaussian blur, median filter, mean filter, mean bilateral filter, chambolle denoising, wavelet denoising, nolocal means denoising, and wiener filter).

Example 3

Program Implementation and Experimental Setup

Dataset and model: This example chose to use the standard datasets CIFAR-10 and ImageNet, and pre-trained neural network (DNN) model architectures, Carlini for CIFAR-10 and InceptionV3 for ImageNet, as shown in Table 1 to evaluate the effectiveness of each chained input transformation ensemble against the adversarial attack examples.

TABLE 1

Pre-trained Models

| Model Name | Dataset | Trainable Parameters | Testing Accuracy | Mean Confidence |
|---|---|---|---|---|
| Carlini | CIFAR-10 | 1,147,978 | 0.7796 | 0.7728 |
| InceptionV3 | ImageNet | 23,817,352 | 0.76276 | 0.93032 |

Adversarial attack example generation methods. This example leveraged the code from cleverhans, Madry Lab, Carlini nn_robust attacks, to implement the attack approaches. Specifically, this example implemented white box attacks FGSM with $\epsilon$=0.1, BIM with $\epsilon$=0.004 and iteration=0.002, PGD $L_\epsilon$, Carlini Wagner $L_0$, $L_2$, $L_\infty$ with target=next attacks, and BPDA.

Input Transformation Implementation. This example implemented all input transformation methods from the library of input transformations in Example 2 by using Python and standard imports including numpy and skimage for Python libraries. All transformation functions take the arrays of size 32×32×3 for CIFAR-10 images and size 299×299×3 for ImageNet images, where the first two dimensions are the images' width and height, and the last dimension represents the 3 color channels (Red, Green and Blue) of an image. In addition, to improve the effectiveness of using randomly combined input transformations to defeat adversarial attack examples, the Python library random is used in all transformations (except for wiener filter) to have random sampling values.

Detection Method. The detection method, which may be similar to the process 200A in FIG. 2A as described above, is to compare the pre-trained learning model's prediction of the original samples with its prediction of the transformed samples after input transformations. If the original and transformed inputs produce substantially different outputs that are larger than a selected threshold, the system classifies these images as adversarial attacks. Different ways, including $L_1$ norm, $L_2$ norm and K-L divergence, may be used to compare the prediction difference between the original and transformed inputs. This example chose to use the $L_2$ norm, which had higher adversarial attack detection rates in the experiment. The $L_2$ norm can be written as score$^{(x, x_{transformed})}$ =$(g(x)-g(x_{transformed}))^2$, where $g(x)$ is the output vector of a DNN model produced by the softmax layer whose i-th entry describes the probability how likely the input x is in the i-th class.

This example chose a threshold that targets a false positive rate on the legitimate examples below 5% to generate the detection rates of input transformations on successful adversarial (attack) examples (SAEs) against the two pre-trained models.

Experiment Environment. In this example, the testing was performed on a DGX-1 fitted with 8 P100 GPUs.

Example 4

Construct a Computationally Efficient but Strong Defense

Initial Observation of the Experiment Results

As the first step of this experiment, the program was run to determine the detection rates of the input transformation ensembles against both CIFAR-10 with pre-trained Carlini Model and ImageNet dataset with pre-trained Inception V3 Model. The ensembles were constructed as follows:

1) Each of the at least 33 input transformation techniques in the library in Example 2.
2) All ensembles of any two of the at least 33 input transformations in the library in Example 2.
3) Ensembles composed of five input transformations. That is, the five input transformations were randomly chosen from five out of nine groups in the library in Example 2.

In order to have a large dataset for an analysis, the program was run multiple times, and obtained thousands of results. An initial analysis showed:

1) The same transformation technique provided a different detection rate against different attacks.
2) A small number of transformations, such as adaptive histogram equalization, were stronger than many other transformations, which provided strong defenses against most of the attacks.
3) Most ensembles of input transformations provided a stronger defense as the number of ensembles increased. However, it is not necessarily to always choose a large ensemble of input transformations, since many shorter input transformation ensembles provided strong defenses. This exemplary observation supports the notion that adversarial attack detection may be performed efficiently and with fewer computing resources, if an input transformation ensemble (e.g., a transformation set) is predetermined and selected by adopting an empirical testing procedure, like the process 200A in FIG. 2A or the process 200B in FIG. 2B, using at least one known adversarial attack. Using such a predetermined transformation set based on empirical testing is superior to prior techniques where random combinations of transformations were used.
4) PGD attack was a stronger attack than BPDA in these test results, where 9% of the transformation or its combinations against PGD $L_\infty$ attack on ImageNet with Inception V3 model had a detection rate of 0, and 32% of them on the same dataset had a detection rate less than 50%. Some of these ensembles with such a low detection rate were composed of 5 or even more transformations (i.e. the combination of JPEG compression, FFT Pertubation, YUV, Gaussian, Color Reduction had a very weak defense against PGD attack), which showed that a barrage of input transformation ensembles do not necessarily guarantee a strong defense.

A Further Analysis of the Input Transformation Ensembles

Following the first step experiment above and conclusion that a barrage of input transformation ensembles do not necessarily guarantee a strong defense, the program was adjusted to conduct a further analysis, aiming to explore how to construct a computationally efficient strong defense.

This time, two kinds of attacks were used, FGSM with $\epsilon=0.01$, 0.05, 0.1 and Carlini Wagner ($L_\infty$ with target=next attacks) on a pre-trained Carlini model, to obtain a large number of detection rates. First, upon analyzing the results, 5 strongest and weakest defenses were selected as shown in Table 2. Then they were combined with each other (one strong with another strong, one weak with another weak, one strong with one weak, three strong, two strong with one week). The results showed: (1) for the same attack, input transformation ensembles clearly had a higher detection rate than a single transformation; (2) two strong input transformation ensembles were stronger than two weak input transformation ensembles, and were also stronger than input transformation ensembles that included a strong and a weak input transformation; (3) changing the order of a strong and a weak input transformation in an ensemble changed the detection rate, but it did not change the detection rates dramatically; (4) three strong input transformation ensemble provided a strong defense to all attacks in this experiment; (5) once an input transformation ensemble was strong enough, adding a strong or a weak input transformation had a similar effect, which did not improve the detection rate dramatically.

TABLE 2

Strong And Weak Input Transformations
for FGSM and Carlini/Wagner on CIFAR-10

| Attack | Defense Effectivess | 5 Selected Transformations |
|---|---|---|
| FGSM | Strong | wiener_Filter, mean_filter, medianfilter, rescale(Random Zoom), chambolle |
| | Weak | color_reduction, lab, mean_bi_filter, yuv, contrast_stretch |

TABLE 2-continued

Strong And Weak Input Transformations
for FGSM and Carlini/Wagner on CIFAR-10

| Attack | Defense Effectivess | 5 Selected Transformations |
|---|---|---|
| Carlini/ Wagner | Strong | chambolle, mean_filter, medianfilter, padding & swirl |
| | Weak | color_reduction, lab, yuv, nonlocal_mean_ran (denoising), onechannel |

For a visual and intuitive look, some of the results were illustrated in FIGS. 5, 6, 7, 8, 9A, and 9B, which used the input transformations listed in Table 2 to defend against FGSM Attacks (with $\epsilon=0.01$, 0.05, 0.1) on the pre-trained Carlini Model.

Figure 5:
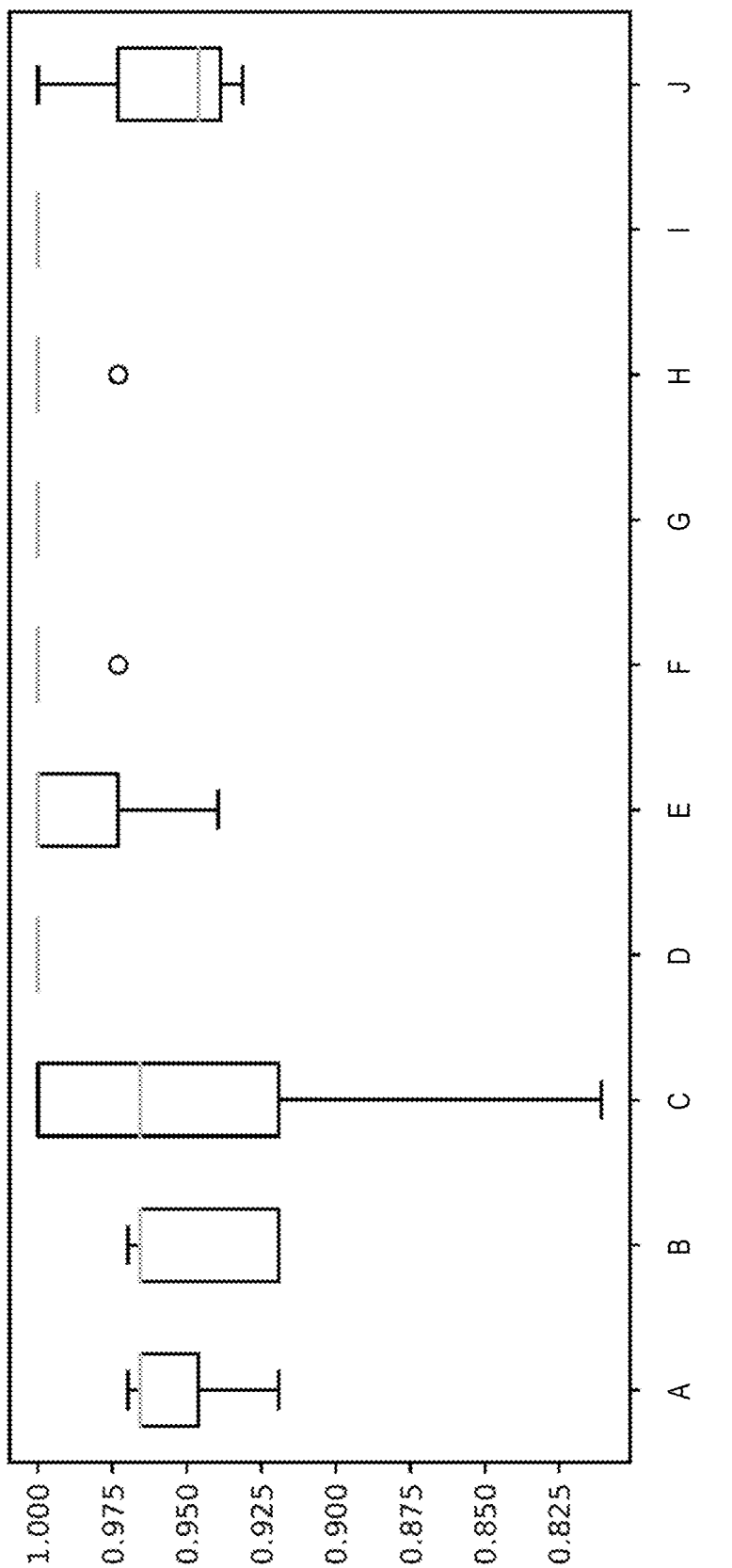
FIG. 5 shows detection rates of transformation ensembles of two randomly combined strong input transformations.
Figure 6:
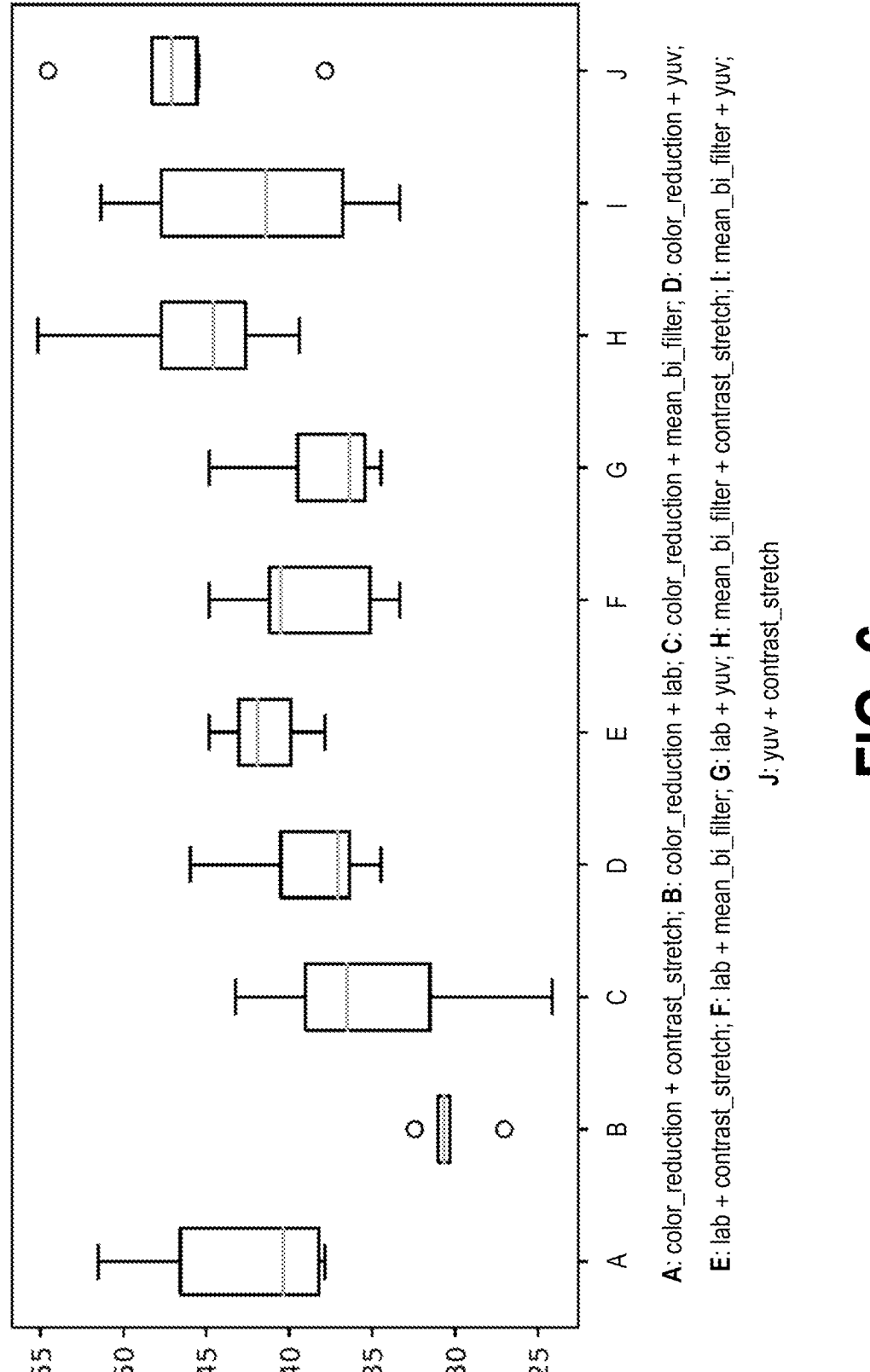
FIG. 6 shows detection rates of transformation ensembles of two randomly combined weak input transformations.

FIG. 5 shows the detection rates of a random combination of any two of five strong defenses. FIG. 6 shows the detection rates of a random combination of any two of five weak defenses. FIG. 7 shows the detection rates of a weak and a strong defense combination. The two strong input transformation ensembles in FIG. 5 provided stronger defenses than ensembles in FIG. 6 and FIG. 7. FIG. 8 shows the detection rates of any three out of the five strong defense combinations. FIG. 9A and FIG. 9B are two parts of one continuous figure and collectively illustrate the detection rates of two strong and a weak defense combinations. While FIG. 9A and FIG. 9B show the combinations of two strong and a weak input transformation techniques had higher detection rates than the corresponding subset combinations of two strong ones, they had weaker defenses than three strong input transformation ensembles shown in FIG. 8.

In order to construct computationally efficient input transformation ensembles, this example also recorded the computational time of each input transformation ensemble in this experiment, as sampled in Table 3. In this table, the computational time of using each input transformation to defeat the corresponding attack is listed below each input transformation, which clearly shows the same input transformation against attacks in ImageNet dataset was much more computationally expensive than using them against attacks in CIFAR-10. This analysis on a larger dataset showed the computational time was mostly caused by the image size, trained model, and the number of the input transformations. To be concrete, the computational time of using an input transformation technique on an image in ImageNet was longer than applying the same input transformation technique on a CIFAR-10 image; a longer chain of input transformation ensemble on the same image was more computationally expensive than a short chain of input transformation ensemble; the computational time for each individual transformation in the at least 33 collected techniques in the transformation library in Example 2 against the same dataset and pre-trained model does not have much difference from each other.

TABLE 3

Computational Cost For Input Transformation Samples

| | | | Input Transformation | | | | |
|---|---|---|---|---|---|---|---|
| Model | Dataset | Attack | Color Reduction | JPEG Compression | Swirl | Noise Gaussian | FFT |
| Carlini | CIFAR10 | FGSM with $\epsilon = 0.1$ | 0.00070116 s | 0.00161086 s | 0.00140541 s | 0.00087631 s | 0.00186646 s |
| Carlini | CIFAR10 | PGD | 0.000732653 s | 0.001688645 s | 0.001410549 s | 0.000894454 s | 0.001690173 s |
| Inception V3 | ImageNet | PGD | 0.013129768 s | 0.079522431 s | 0.045536399 s | 0.022339778 s | 0.038208852 s |

It follows that when the effectiveness against an adversarial attack is comparable, a short chain of input transformation ensemble (e.g., a transformation set with a small number of transformations) will be more computationally efficient and result in less computational time demand than a long chain of input transformation ensemble (e.g., a transformation set with a large number of transformations). It can be appreciated that any computational time saving will be beneficial for real world mission critical use cases where a millisecond matters and decisions are made in real time in response to everchanging inputs from outside environments, like defending against adversarial input in the operation of an object recognition device (e.g., the object recognition device 150 in FIG. 1), an autonomous vehicle (e.g., the vehicle 160 in FIG. 1), or an augmented reality device (e.g., the augmented reality device 180 in FIG. 1). Therefore, empirical testing and design (e.g., method 400 in FIG. 4 together with process 200A in FIG. 2A or process 200B in FIG. 2B) may be used to generate a predetermined transformation set with the minimum number of transformations to maximize computational efficiency while being effective against an adversarial input. In contrast, the use of random combination of transformations in prior techniques may require a large barrage of transformations, which is not computationally efficient and does not guarantee a strong defense as illustrated in this example.

Sample Computational Efficient but Strong Defense

With all the results described above, it was noted that three strong image ensembles constructed computationally efficient but strong defenses. With this observation, this example tested all three input transformation ensembles from the 5 selected strong input transformations listed in Table 2 against FGSM ($\epsilon$=0.01, 0.05, 0.1), Carli/Wagner ($L_0$, $L_2$ and $L_\infty$ Targeted), PGD attacks on the pre-trained Carlini model. Out of the 70 results, except for 5 results with 3 ensembles ("Mean Filter, Median Filter, Random Zoom", "Mean Filter, Median Filter, Chambolle Denoising", "Median Filter, Random Zoom, Chambolle Denoising") against PGD and FGSM attack that received detection rates between 96% and 98%, all others received an 100% detection rate. This example also tested all ensembles composed of five strong input transforms with the same attacks, and received 100% detection rates for all tested attacks. For the testing on ImageNet with pre-trained Inception V3, similar results were received, which showed three strong image ensembles provide strong defenses against state-of-the-art adversarial attack examples as referenced in the present disclosure.

These examples above investigated the effectiveness of using input transformation ensembles to defend against state-of-the-art adversarial attacks. In order to have a thorough evaluation, the examples not only established a transformation library of at least 33 input transformation techniques, but also tested all kinds of input transformation ensembles against popular known attacks, including FGSM, BIM, PGD, Carlin Wagner and BPDA on both CIFAR-10 and ImageNet datasets. The evaluation showed, in all tested state-of-the-art adversarial attack examples, PGD was the strongest adversarial attack example. A large barrage of input transformation ensembles did not guarantee a strong defense against such a strong attack. Instead, the experiments showed that using three strong input transformation ensembles provided a computationally efficient but strong defense.

Although the embodiments of the present disclosure and their advantages have been described in detail, it should be understood that various changes, substitutions and alterations can be made herein without departing from the spirit and scope of the disclosure as defined by the appended claims. Moreover, the scope of the present disclosure is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system for defending an artificial intelligence model against adversarial input, the system comprising:

a memory storing a plurality of transformations;

one or more processors communicatively coupled to the memory;

an artificial intelligence model; and a transformation engine executable by the one or more processors and configured to:

receive an input to the artificial intelligence model;

apply a pre-determined transformation set to the input to produce a transformed input, wherein the pre-determined transformation set comprises a first combination of transformations selected from among the plurality of transformations based upon a determination that the first combination of transformations provides a threshold level of detection of an adversarial attack on the artificial intelligence model;

apply a plurality of transformation sets to at least one known adversarial input, wherein the plurality of transformation sets are stored in the memory, the plurality of transformation sets include the pre-determined transformation set, wherein each transformation set of the plurality of transformation sets comprises:

a pre-determined number of transformations of the plurality of transformations, and wherein different transformation sets of the plurality of transformation sets comprise different combinations of the plurality of transformations stored in the memory, a combination of transformations empirically tested to provide at least a threshold detection rate with respect to at least one type of adversarial attack, wherein at least the threshold detection rate is the percentage rate of correctly determining the at least one known adversarial input to be associated with the adversarial attack;

determine accuracy metrics for each transformation set of the plurality of transformation sets based on the applying the plurality of transformation sets to at least one known adversarial input, wherein the accuracy metrics comprise information indicating an effectiveness for each transformation set in defending against the at least one known adversarial input;

generate a first output based on the input using the artificial intelligence model;

apply the artificial intelligence model to the transformed input to produce a second output;

determine whether the input comprises an adversarial attack based on a comparison of the first output and the second output; and generate a control signal in response to a determination of whether the input comprises an adversarial attack, wherein the control signal comprises a first control signal when the input does not comprise an adversarial attack and comprises a second control signal when the input comprises an adversarial attack, wherein the first control signal and second control signal are associated with different commands.

2. The system of claim 1, wherein one or more of the plurality of transformations, one or more of the plurality of transformation sets, or both are updated periodically.

3. The system of claim 1, wherein the input comprises a visual input.

4. The system of claim 1, wherein the first combination of transformations of the predetermined transformation set are applied to the input in a particular order.

5. The system of claim 4, wherein the first combination of transformations comprise at least a first transformation and a second transformation, and wherein the particular order specifies that the second transformation of the first combination of transformations is applied to an output generated by application of the first transformation of the first combination of transformations to the input.

6. The system of claim 1, wherein the transformation engine is configured to:

apply additional pre-determined transformation sets to the input in parallel to produce additional transformed inputs;

apply the artificial intelligence model to the additional transformed inputs to produce additional second outputs, respectively; and determine whether the input comprises an adversarial attack based on a comparison of the first output and the additional second outputs.

7. The system of claim 1, wherein the input is determined to comprise an adversarial attack if the difference of the first output and the second output exceeds a preset threshold.

8. A method for defending an artificial intelligence model against adversarial input, the method comprising:

receiving, by one or more processors, an input to an artificial intelligence model;

applying, by the one or more processors, a pre-determined transformation set to the input to produce a transformed input, wherein the pre-determined transformation set comprises a first combination of transformations selected from among a plurality of transformations based upon a determination that the first combination of transformation provides a threshold level of detection of an adversarial attack on the artificial intelligence model;

applying, by the one or more processors, a plurality of transformation sets to at least one known adversarial input, wherein the plurality of transformation sets are stored in the memory, the plurality of transformation sets include the pre-determined transformation set, wherein each transformation set of the plurality of transformation sets comprises:

a pre-determined number of transformations of the plurality of transformations, and wherein different transformation sets of the plurality of transformation sets comprise different combinations of the plurality of transformations stored in the memory, a combination of transformations empirically tested to provide at least a threshold detection rate with respect to at least one type of adversarial attack, wherein at least the threshold detection rate is the percentage rate of correctly determining the at least one known adversarial input to be associated with the adversarial attack, the plurality of transformation sets are applied to the at least one known adversarial input in parallel, the effectiveness for each transformation set in defending against the at least one known adversarial input comprises the detection rate of the adversarial attack in the at least one known adversarial input;

determining, by the one or more processors, accuracy metrics for each transformation set of the plurality of transformation sets based on the applying the plurality of transformation sets to at least one known adversarial input, wherein the accuracy metrics comprise information indicating an effectiveness for each transformation set in defending against the at least one known adversarial input;

generating, by the one or more processors, a first output based on the input using the artificial intelligence model;

applying the artificial intelligence model to the transformed input to produce a second output;

determining whether the input comprises an adversarial attack based on a comparison of the first output and the second output; and generating, by the one or more processors, a control signal in response to the determining of whether the input to the artificial intelligence model comprises an adversarial attack, wherein the control signal comprises a first control signal when the input does not comprise an adversarial attack and comprises a second control signal when the input comprises an adversarial attack, wherein the first control signal and second control signal are associated with different commands.

9. A method for defending an artificial intelligence model against adversarial input, the method comprising:

generating, by one or more processors, a plurality of transformation sets based on a plurality of transformations, wherein each transformation set of the plurality of transformation sets comprises a different combination of transformations selected from the plurality of transformations;

applying, by the one or more processors, the plurality of transformation sets to at least one known adversarial input, wherein the plurality of transformation sets are stored in the memory, the plurality of transformation sets include the pre-determined transformation set, wherein each transformation set of the plurality of transformation sets comprises:

a pre-determined number of transformations of the plurality of transformations, and wherein different transformation sets of the plurality of transformation sets comprise different combinations of the plurality of transformations stored in the memory, a combination of transformations empirically tested to provide at least a threshold detection rate with respect to at least one type of adversarial attack, wherein at least the threshold detection rate is the percentage rate of correctly determining the at least one known adversarial input to be associated with the adversarial attack, the plurality of transformation sets are applied to the at least one known adversarial input in parallel the effectiveness for each transformation set in defending against the at least one known adversarial input comprises the detection rate of the adversarial attack in the at least one known adversarial input;

determining, by the one or more processors, accuracy metrics for each transformation set of the plurality of transformation sets based on the applying, wherein the accuracy metrics comprise information indicating an effectiveness for each transformation set in defending against the at least one known adversarial input;

identifying, by the one or more processors, transformation sets providing at least a threshold effectiveness in defending the artificial intelligence model against the at least one known adversarial input based on the accuracy metrics;

generating, by the one or more processors, a plurality of defensive transformation sets based on the accuracy metrics, wherein each defensive transformation set of the plurality of defensive transformation sets comprises a pre-determined number of transformations selected from the plurality of transformations, and wherein the pre determined number of transformations in a particular defensive transformation set provide at least the threshold effectiveness in defending against the at least one known adversarial input;

applying, by the one or more processors, at least one defensive transformation set of the plurality of defensive transformation sets to an input to an artificial intelligence model;

determining, by the one or more processors, whether the input to the artificial intelligence model comprises an adversarial attack based on the applying; and generating, by the one or more processors, a control signal in response to the determining of whether the input to the artificial intelligence model comprises an adversarial attack, wherein the control signal comprises a first control signal when the input does not comprise an adversarial attack and comprises a second control signal when the input comprises an adversarial attack, wherein the first control signal and second control signal are associated with different commands.

10. The method of claim 9, wherein the at least one known adversarial input comprises one or more types of known adversarial attacks.

11. The method of claim 9, wherein the input to the artificial intelligence model is received from a sensor, wherein the sensor comprises one or more cameras, one or more temperature sensors, one or more pressure sensors, one or more acoustic sensors, one or more motion sensors, or a combination thereof.

12. The method of claim 9, further comprising transmitting the plurality of defensive transformation sets to a remote device, wherein the remote device comprises a vehicle, an augmented reality device, an object recognition device, or a combination thereof.

13. The method of claim 9, further comprising periodically updating the plurality of defensive transformation sets based on one or more newly emerged adversarial attacks to produce an updated plurality of defensive transformation sets.

14. The method of claim 13, further comprising transmitting the updated plurality of defensive transformation sets to a remote device.

* * * * *